US012583414B2

(12) United States Patent
Terauchi

(10) Patent No.: US 12,583,414 B2
(45) Date of Patent: Mar. 24, 2026

(54) PEDESTRIAN AIRBAG DEVICE FOR VEHICLE

(71) Applicant: SUBARU CORPORATION, Tokyo (JP)

(72) Inventor: Akihiro Terauchi, Tokyo (JP)

(73) Assignee: SUBARU CORPORATION, Shibuya-ku (JP)

( * ) Notice: Subject to any disclaimer, the term of this patent is extended or adjusted under 35 U.S.C. 154(b) by 0 days.

(21) Appl. No.: 19/252,646

(22) Filed: Jun. 27, 2025

(65) Prior Publication Data

US 2026/0061961 A1 Mar. 5, 2026

(30) Foreign Application Priority Data

Sep. 4, 2024 (JP) ................................. 2024-152006

(51) Int. Cl.
*B60R 21/36* (2011.01)
*B60R 21/34* (2011.01)
(52) U.S. Cl.
CPC ........ *B60R 21/36* (2013.01); *B60R 2021/346* (2013.01)
(58) Field of Classification Search
CPC ........................... B60R 21/36; B60R 2021/346
See application file for complete search history.

(56) References Cited

U.S. PATENT DOCUMENTS

| | | | |
|---|---|---|---|
| 6,497,302 B2 * | 12/2002 | Ryan | ....................... B60R 21/36 280/730.1 |
| 7,845,454 B2 * | 12/2010 | Takimoto | ............ B60R 21/2338 180/274 |
| 2005/0205333 A1 * | 9/2005 | Mori | ....................... B60R 21/36 180/274 |

(Continued)

FOREIGN PATENT DOCUMENTS

| | | | | |
|---|---|---|---|---|
| JP | 2006256447 | A | * | 9/2006 |
| JP | 4187260 | B2 | * | 11/2008 ............. B60R 21/36 |

(Continued)

OTHER PUBLICATIONS

Translation of JP-2006256447-A.*
Translation of JP-4187260-B2.*

*Primary Examiner* — Paul N Dickson
*Assistant Examiner* — Shams Dhanani
(74) *Attorney, Agent, or Firm* — SoraIP, Inc.

(57) ABSTRACT

A pedestrian airbag device for a vehicle includes a case, a bag, a left inflator, and a right inflator. The bag is stored in the case provided below a hood of the vehicle. The bag is configured to deploy from between the hood and a windshield. The bag has a middle transverse deployment portion that deploys in the vehicle width direction, a left rearward deployment portion connected with the left end of the middle transverse deployment portion, a right rearward deployment portion connected with the right end of the middle transverse deployment portion, and a left standing deployment portion and a right standing deployment portion (Continued)

that are configured to deploy inside the case. The left standing deployment portion is connected with at least the left rearward deployment portion. The right standing deployment portion is connected with at least the right rearward deployment portion.

9 Claims, 6 Drawing Sheets

(56) References Cited

U.S. PATENT DOCUMENTS

| | | | | |
|---|---|---|---|---|
| 2007/0023223 A1* | 2/2007 | Okamoto | .......... | B32B 17/10761 |
| | | | | 180/274 |
| 2007/0262569 A1* | 11/2007 | Kikuchi | ................ | B60R 21/215 |
| | | | | 180/274 |
| 2014/0291054 A1* | 10/2014 | Tanaka | .................... | B60R 21/36 |
| | | | | 180/274 |
| 2016/0375856 A1* | 12/2016 | Osanai | .................... | B60R 21/38 |
| | | | | 180/274 |
| 2023/0339425 A1 | 10/2023 | Harada | | |

FOREIGN PATENT DOCUMENTS

| | | |
|---|---|---|
| JP | 2023-071119 A | 5/2023 |
| WO | 2022/050145 A1 | 3/2022 |

* cited by examiner

PEDESTRIAN AIRBAG DEVICE FOR VEHICLE

CROSS-REFERENCE TO RELATED APPLICATIONS

The present application claims priority from Japanese Patent Application No. 2024-152006 filed on Sep. 4, 2024, the entire contents of which are hereby incorporated by reference.

BACKGROUND

The present disclosure relates to pedestrian airbag devices for vehicles.

There are pedestrians, cyclists, bikers, etc. on roads on which vehicles such as automobiles travel. Vehicles may collide with such pedestrians etc. Japanese Unexamined Patent Application Publication (JP-A) No. 2023-071119 discloses a pedestrian airbag device that covers the right and left A-pillars of a vehicle by deploying right and left bags rearward from below the hood of the vehicle. In JP-A No. 2023-071119 A, the bags do not deploy between the hood and the windshield. In this case, a pedestrian etc. that has collided with a vehicle may be able to avoid direct contact with the right and left A-pillars, but may not be able to avoid direct contact with the rear part of the hood and the windshield. International Patent Application Publication WO 2022/050145 A1 discloses a bag that deploys rearward of the hood into a generally U-shape. In this case, a pedestrian etc. who has collided with a vehicle may be able to avoid direct contact with the right and left A-pillars and the rear part of the hood and the windshield.

SUMMARY

A pedestrian airbag device for a vehicle according to one embodiment of the present disclosure includes a case, a bag, a left inflator, and a right inflator. The case is provided below a hood of the vehicle, and is elongated in the vehicle width direction of the vehicle. The bag is stored in the case, and is configured to deploy from between the hood and a windshield. The left inflator and the right inflator are arranged side by side in the vehicle width direction, and are configured to release high-pressure gas into the bag stored in the case. The bag has a left rearward deployment portion, a right rearward deployment portion, a middle transverse deployment portion, a left fixed portion, a right fixed portion, a first left standing deployment portion, and a first right standing deployment portion. The left rearward deployment portion is configured to deploy along the left edge of the windshield in the vehicle width direction. The right rearward deployment portion is configured to deploy along the right edge of the windshield in the vehicle width direction. The middle transverse deployment portion is configured to deploy in the vehicle width direction between the hood and the windshield. The left rearward deployment portion is connected with the left end of the middle transverse deployment portion in the vehicle width direction. The right rearward deployment portion is connected with the right end of the middle transverse deployment portion in the vehicle width direction. The left fixed portion is coupled to the left inflator and fixed to the case, and is configured to deploy inside the case. The right fixed portion is coupled to the right inflator and fixed to the case at a position rightward of the left fixed portion in the vehicle width direction, and is configured to deploy inside the case. The first left standing deployment portion connects at least the left rearward deployment portion out of the middle transverse deployment portion and the left rearward deployment portion to the left fixed portion. The first right standing deployment portion connects at least the right rearward deployment portion out of the middle transverse deployment portion and the right rearward deployment portion to the right fixed portion. The first left standing deployment portion and the first right standing deployment portion are configured to deploy to above the upper edge of the case.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION

Figure 1:
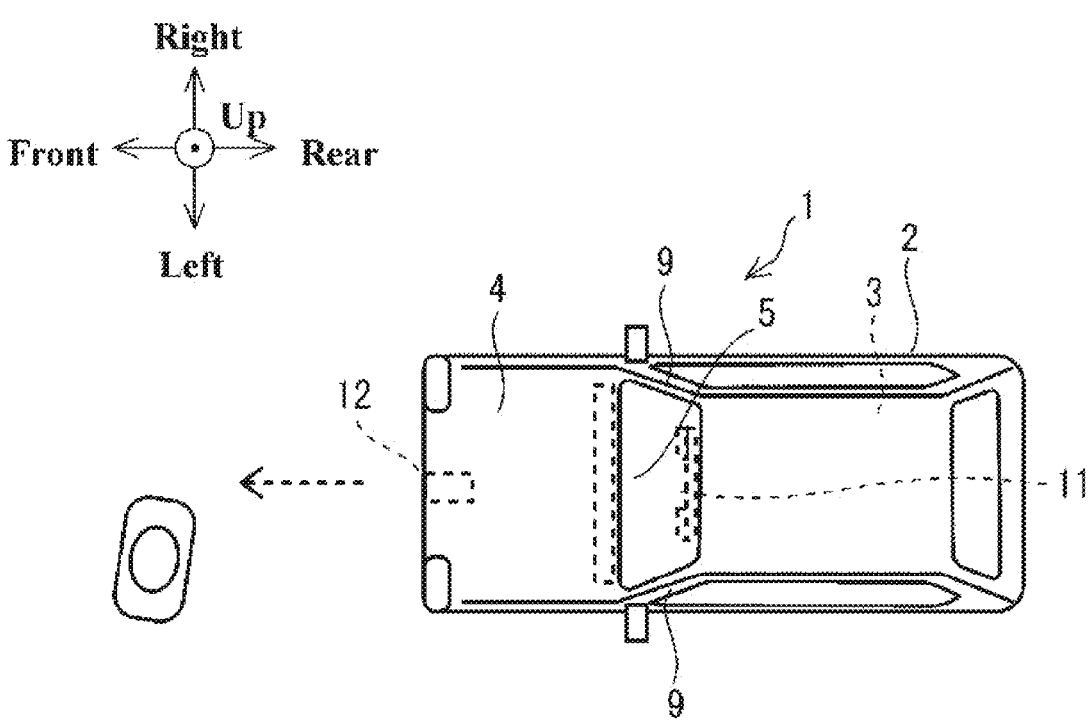
FIG. 1 illustrates an automobile according to a first embodiment of the present disclosure.

A bag that covers both between the hood and the windshield and the right and left A-pillars as in, for example, WO 2022/050145 has a larger capacity than bags of other airbag devices used inside vehicles. Therefore, it may take time for a bag such as that in WO 2022/050145 to deploy even by using multiple inflators.

Moreover, in WO 2022/050145, the right one of the inflators is preferentially used to deploy the middle portion of the bag between the hood and the windshield. In this case, the middle portion of the bag deploys first, and high-pressure gas is then introduced into a left rearward deployment portion and a right rearward deployment portion of the bag through the middle portion etc. As a result, the high-pressure gas basically flows outward in the vehicle width direction in the left rearward deployment portion and the right rearward deployment portion. The right rearward deployment portion and the left rearward deployment portion tend to deploy outward to the right and left, respectively, before they deploy rearward. Each of the right rearward deployment portion and the left rearward deployment portion also tends to flap during deployment because it deploys by repeating a process in which its front part deploys first and then its rear part deploys. In particular, in WO 2022/050145, an inner bag provided in the middle portion of the bag preferentially deploys using the right inflator. Therefore, the deploying inner bag may block the flow of the high-pressure gas from the left inflator. In this case, deployment of the right rearward deployment portion may be delayed with respect to deployment of the left rearward deployment portion in addition to with respect to deployment of the middle portion.

Pedestrian airbag devices for vehicles have therefore room for improvement in bag deployment.

Hereinafter, embodiments of the present disclosure will be described with reference to the drawings. In a first embodiment, one example of the basic configuration etc. of a pedestrian airbag device 20 for a vehicle and one example of the stored and deployed states of a bag 23 will be described together with an overview of the first embodiment. In second to fourth embodiments, one example of the deployed state of the bag 23 of each embodiment will be described together with an overview of each embodiment. The following description of the embodiments and the drawings are merely by way of illustration of the present disclosure and are not intended to limit the present disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Overview

There are bags that are mounted on vehicles to protect pedestrians. Such a pedestrian protection bag deploys from between the hood and the windshield of a vehicle. A pedestrian protection bag is stored in a case between the hood and the windshield of a vehicle. Some of such pedestrian protection bags deploy into a generally U-shape. The generally U-shape is formed by a middle transverse deployment portion that deploys in the vehicle width direction, a left rearward deployment portion connected with the left side of the middle transverse deployment portion, and a right rearward deployment portion connected with the right side of the middle transverse deployment portion. A pedestrian protection bag has a larger capacity than a bag of an occupant protection airbag device used inside a vehicle. Therefore, it tends to take time for a pedestrian protection bag to deploy into a desired shape. A pedestrian protection bag that deploys into a generally U-shape serves to protect pedestrians. However, deployment of the left rearward deployment portion and the right rearward deployment portion may be delayed, or it may take time for deployment of the left rearward deployment portion and the right rearward deployment portion to stabilize. Therefore, a bag 23 according to an embodiment of the present disclosure has a standing deployment portion in addition to a portion that deploys into a generally U-shape. The bag 23 has a plurality of the standing deployment portions on the right and left sides. The standing deployment portions connect a fixed portion of the bag 23 and the generally U-shaped portion of the bag 23. The fixed portion is fixed to a case 24. The generally U-shaped portion of the bag 23 is configured to deploy outside the case 24. The left standing deployment portion is connected with at least a left rearward deployment portion 32 out of a middle transverse deployment portion 30 and the left rearward deployment portion 32. The 20 right standing deployment portion is connected with at least a right rearward deployment portion 31 out of the middle transverse deployment portion 30 and the right rearward deployment portion 31. The standing deployment portions deploy so as to stand inside the case 24. This allows the generally U-shaped portion of the bag 23 to deploy above the case 24. Since the middle transverse deployment portion 30, the left rearward deployment portion 32, and the right rearward deployment portion 31 deploy above the case 24, the middle transverse deployment portion 30, the left rearward deployment portion 32, and the right rearward deployment portion 31 can deploy into a generally U-shape so as to cover from a hood 4 to A-pillars 9 at both the right and left edges of a windshield 5. The bag 23 deploys into a generally U-shape above the upper surface of the hood 4 at the time of deployment of the bag 23. This allows the bag 23 to have a front deployment portion 49 that deploys onto the upper surface of the hood 4. Hereinafter, the first embodiment will be described with reference to the drawings.

Basic Configuration: Generally U-shaped Pedestrian Protection Bag

FIG. 1 illustrates an automobile 1 according to the first embodiment of the present disclosure. In the first embodiment of the present disclosure described below, the terms "up," "down," "right," "left," "front," and "rear" are used based on the illustration in FIG. 1. The vehicle width direction of the automobile 1 is the left-right direction of the automobile 1.

The automobile 1 in FIG. 1 includes: a vehicle body 2 including a vehicle cabin 3 that accommodate occupants; the windshield 5 at the front of the vehicle cabin 3; and the hood 4 forming the upper surface of the part of the vehicle body 2 that is located forward of the windshield 5. The right and left A-pillars 9 are provided at both the right and left edges of the windshield 5 in the vehicle width direction. In FIG. 1, the automobile 1 is traveling forward. There is a pedestrian in front of the automobile 1.

Figure 2:
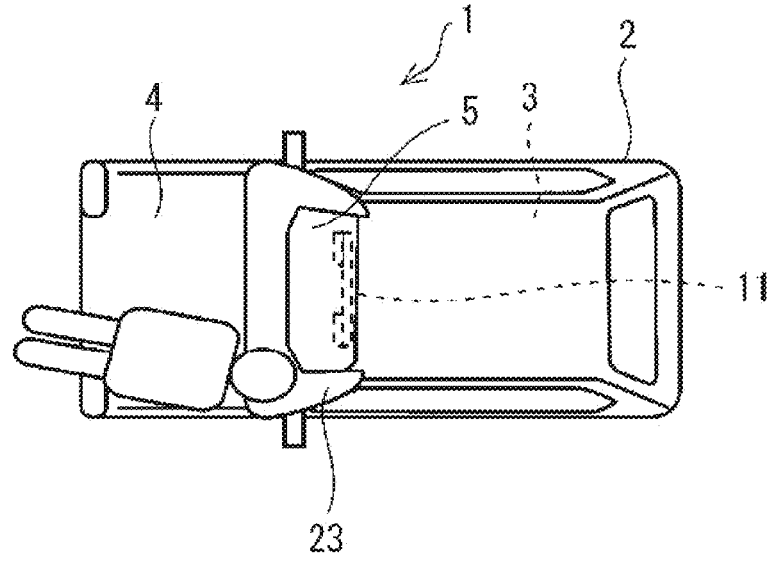
FIG. 2 illustrates the automobile in FIG. 1 that has collided with a pedestrian.

FIG. 2 illustrates the automobile 1 in FIG. 1 having collided with the pedestrian. When the automobile 1 moves forward from the situation in FIG. 1, the automobile 1 will collide with the pedestrian. The pedestrian falls onto the hood 4 after the collision.

The automobile 1 is configured to deploy the pedestrian protection bag 23 in order to protect a pedestrian in the event of such a collision. The pedestrian protection bag 23 basically starts to deploy from between the windshield 5 and the hood 4. As will be described later, the pedestrian protection bag 23 in FIG. 2 is configured to deploy into a generally U-shape. The generally U-shape is formed by the middle transverse deployment portion 30 that deploys in the vehicle width direction, the left rearward deployment portion 32 that deploys rearward on the left side of the middle transverse deployment portion 30, and the right rearward deployment portion 31 that deploys rearward on the right side of the middle transverse deployment portion 30. The left rearward deployment portion 32 overlaps the left A-pillar 9 at the windshield 5 of the automobile 1. The right rearward deployment portion 31 overlaps the right A-pillar 9 at the windshield 5 of the automobile 1. The head etc. of a pedestrian who has fallen onto the hood 4 are therefore less likely to directly hit the hood 4 and also the right and left A-pillars 9. Since the generally U-shaped bag 23 in FIG. 2 deploys in accordance with various certification and information disclosure standards, desired improvement in pedestrian protection performance can be expected. In addition to pedestrians, cyclists, bikers, etc. may also collide with the automobile 1 in this manner.

Basic Configuration: Configuration of Pedestrian Protection Device

Figure 3:
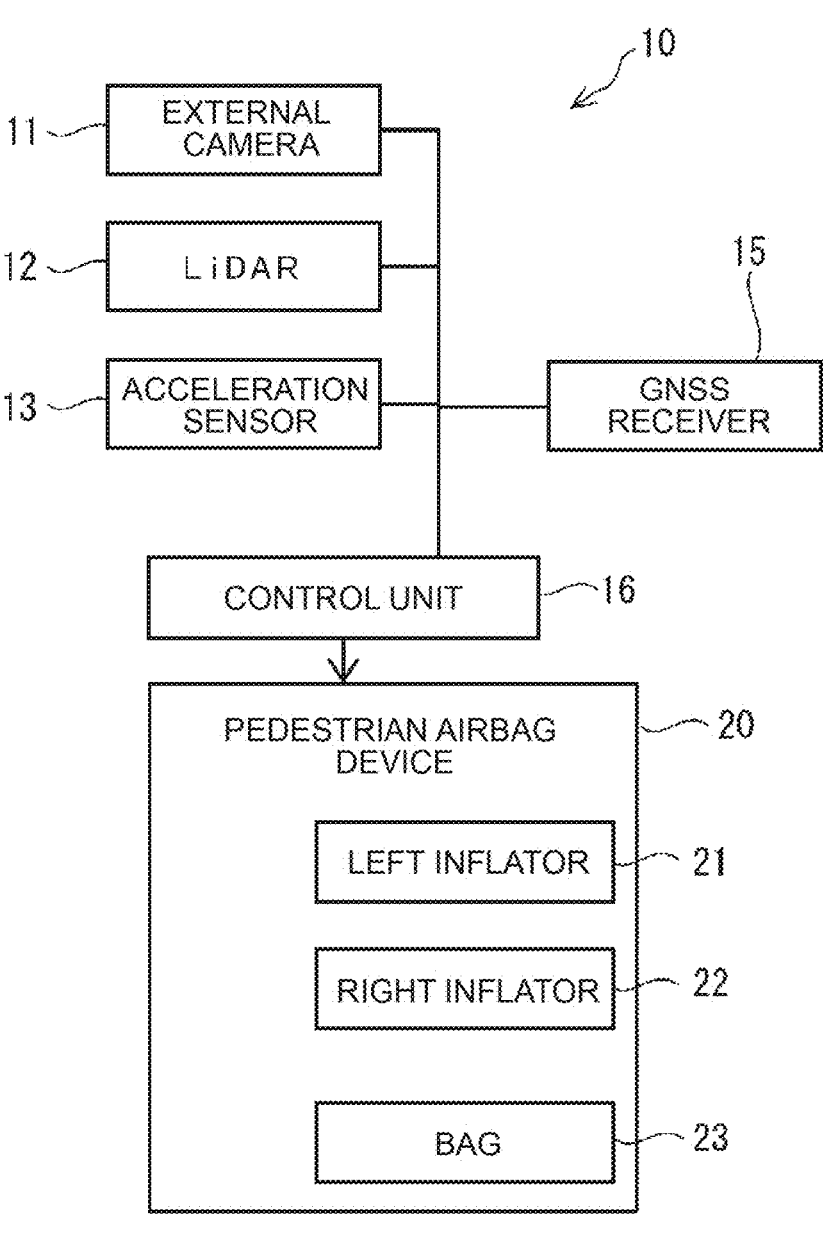
FIG. 3 is a configuration diagram of a pedestrian protection device for the automobile in FIG. 1.

The automobile 1 in FIG. 1 includes a pedestrian protection device 10 illustrated in FIG. 3. FIG. 3 is a configuration diagram of the pedestrian protection device 10. The pedestrian protection device 10 in FIG. 3 includes an external camera 11, a light detection and ranging (LiDAR) 12, an acceleration sensor 13, a global navigation satellite system (GNSS) receiver 15, a pedestrian airbag device 20, and a control unit 16 to which these sensors and devices are coupled. Each of these sensors and devices of the pedestrian protection device 10 may be coupled to the control unit 16 via a vehicle network, not illustrated. The control unit 16 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control unit 16. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the control unit 16.

As illustrated in FIG. 1, the external camera 11 may be a stereo camera that is installed forward-facing in the vehicle cabin 3 of the automobile 1. Alternatively, the external camera 11 may be, for example, a monocular camera or a 360-degree camera. The external camera 11 captures an image of the surroundings in front of the automobile 1, namely in the direction of travel of the automobile 1. In the case of FIG. 1, the external camera 11 may capture an image of a pedestrian in front of the automobile 1. As illustrated in FIG. 1, the LiDAR 12 is provided at the front edge of the automobile 1. The LiDAR 12 scans the area in front of the automobile 1 with a laser beam, receives reflected light from a pedestrian outside the automobile 1, and generates spatial information on the scanning range.

The acceleration sensor 13 detects the acceleration of the automobile 1. The acceleration sensor 13 may detect accelerations of the automobile 1 in three axial directions, namely the front-rear, left-right, and up-down directions. The acceleration sensor 13 may generate and output the roll, pitch, and yaw accelerations of the automobile 1 based on the detected accelerations in the three axial directions. When a pedestrian collides with the vehicle body 2 of the automobile 1, the acceleration sensor 13 detects a large acceleration that does not occur during normal traveling of the automobile 1.

The GNSS receiver 15 receives radio waves from GNSS satellites and generates the location, time, speed, and acceleration of the automobile 1.

The pedestrian airbag device 20 includes the bag 23, a left inflator 22, and a right inflator 21. As illustrated in FIG. 2, the bag 23 is configured to deploy onto the outer surface of the vehicle body 2 of the automobile 1. The left inflator 22 and the right inflator 21 are configured to release high-pressure gas into the bag 23.

The control unit 16 is configured to control the pedestrian protection device 10. The control unit 16 repeatedly executes pedestrian protection control.

In the pedestrian protection control, the control unit 16 first determines, based on a newly acquired captured image or spatial information, whether there is a pedestrian in the path of the automobile 1. In addition to determining whether there is a pedestrian in the path of the automobile 1, the control unit 16 may determine whether the position of the pedestrian is on the path of the automobile 1, whether the direction of travel of the pedestrian intersects the path of the automobile 1, etc. Hereafter, the position where the direction of travel of the pedestrian intersects with the path of the automobile will be referred to as an intersection position. The control unit 16 predicts a collision with the pedestrian in the path of the automobile 1. For example, the control unit 16 may predict that the automobile 1 will collide with the pedestrian in the path of the automobile 1 when the time difference between when the automobile 1 reaches the position of the pedestrian or the intersection position and when the pedestrian reaches the intersection position is equal to or less than a predetermined value. When the control unit 16 predicts that the automobile 1 will collide with a pedestrian in the path of the automobile 1, the control unit 16 starts preparation for the collision with the pedestrian in the path of the automobile 1. For example, the control unit 16 activates the pedestrian airbag device 20. The control unit 16 puts the pedestrian airbag device 20 into, for example, a standby state in which the left inflator 22 and the right inflator 21 can release high-pressure gas in response to, for example, an ignition signal. The control unit 16 may also decelerate and stop the automobile 1 using a braking device, not illustrated. The control unit 16 then detects the predicted collision between the automobile 1 and the pedestrian based on the acceleration sensor 13. When the control unit 16 detects the collision, it deploys the bag 23 of the pedestrian airbag device 20. The control unit 16 outputs an ignition signal to the left inflator 22 and the right inflator 21 of the pedestrian airbag device 20. The left inflator 22 and the right inflator 21 of the pedestrian airbag device 20 release high-pressure gas into the bag 23. As illustrated in FIG. 2, the bag 23 deploys so as to overlap the area from the hood 4 to the windshield 5 of the vehicle body 2. On the other hand, for example, when the control unit 16 does not detect the collision based on the acceleration sensor 13 even after a predicted time to collision passes, the control unit 16 determines, based on a new captured image or spatial information, whether the collision between the automobile 1 and the pedestrian has been avoided. An example of the situation where the control unit 16 determines that the collision between the automobile 1 and the pedestrian has been avoided is when the pedestrian predicted to collide with the automobile 1 stays out of the path of the automobile 1. Other examples of the situation include when the direction of travel of the pedestrian predicted to collide with the automobile 1 has changed so as not to intersect the path of the automobile 1 and when the automobile 1 has stopped in front of the pedestrian. When the control unit 16 determines that the collision between the automobile 1 and the pedestrian has been avoided, the control unit 16 may cancel the standby state.

As described above, when a collision between the automobile 1 in FIG. 1 and a pedestrian is detected, the automobile 1 can activate the pedestrian airbag device 20 to deploy the generally U-shaped bag 23 over the area from the hood 4 to the windshield 5 of the automobile 1. The pedestrian having collided with the automobile 1 is therefore less likely to directly contact the rear part of the hood 4 and the windshield 5 and also the right and left A-pillars 9.

However, a generally U-shaped bag has a larger capacity than a bag of an occupant protection airbag device used inside a vehicle. Therefore, it basically tends to take time for a generally U-shaped bag to deploy even by using multiple inflators. Moreover, right and left rearward deployment portions of a generally U-shaped bag that deploy rearward on the right and left sides of a middle transverse deployment portion, respectively, are folded more complicatedly and in more layers and stored in a case, compared to the middle transverse deployment portion. The left rearward deployment portion and the right rearward deployment portion therefore tend to deploy later than the middle transverse deployment portion. As a result, deployment of the left rearward deployment portion and the right rearward deployment portion is delayed with respect to deployment of the middle transverse deployment portion. Even after deployment of the bag is started, it may take time until the entire bag deploys into a desired U-shape in a desired state, namely in a state in which the bag overlaps the right and left A-pillars 9.

When an inflator releases high-pressure gas into the middle transverse deployment portion of the bag, the middle transverse deployment portion deploys first, and then the left rearward deployment portion and the right rearward deployment portion deploy. The high-pressure gas is introduced into the left rearward deployment portion and the right rearward deployment portion through the middle transverse deployment portion. Therefore, the high-pressure gas basically flows outward in the vehicle width direction in the left rearward deployment portion and the right rearward deployment portion. The right rearward deployment portion and the left rearward deployment portion tend to deploy outward toward the right and left, respectively, before they deploy rearward. Each of the right rearward deployment portion and the left rearward deployment portion also tends to flap during deployment because it deploys by repeating a process in which its front part deploys first and then its rear part deploys. As a result, it may take time for the right rearward deployment portion and the left rearward deployment portion to stabilize in the desired state, namely in the state in which the right and left rearward deployment portions overlap the right and left A-pillars 9, respectively.

As described above, such a pedestrian airbag device has room for improvement in deployment of the generally U-shaped bag.

Stored State of Bag

Figure 4:
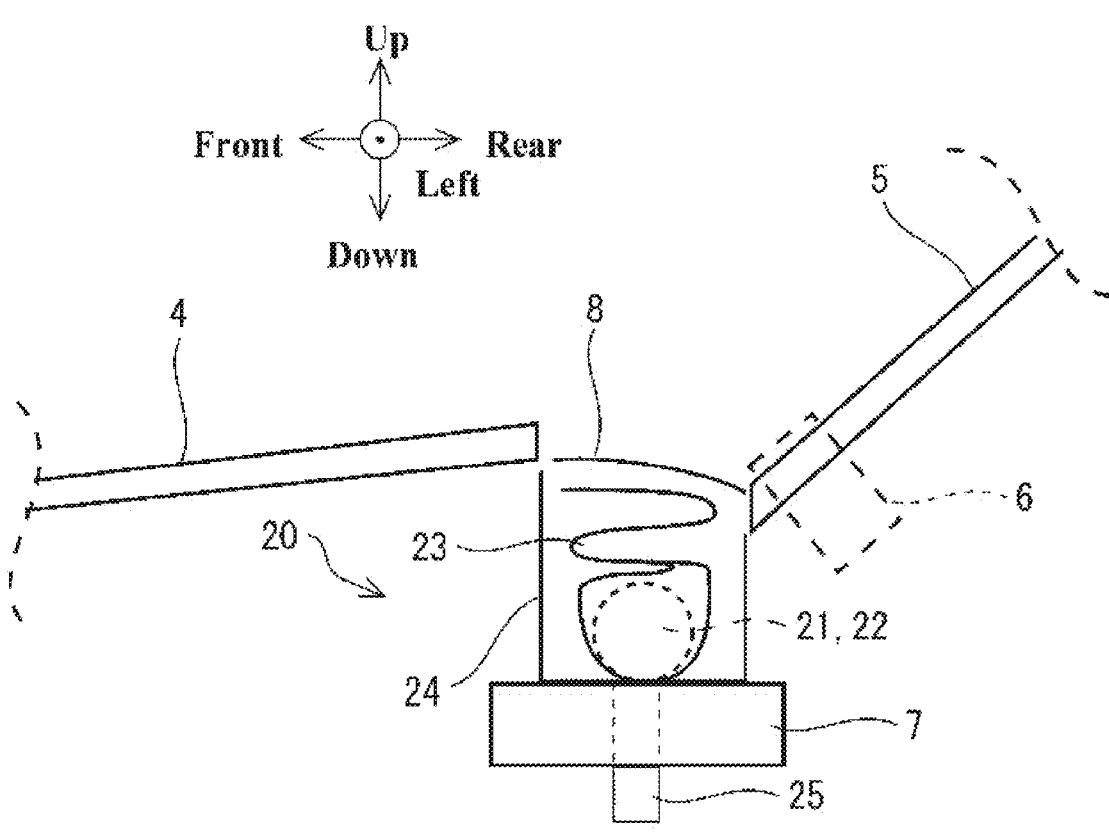
FIG. 4 illustrates a pedestrian airbag device in FIG. 3 and components around the pedestrian airbag device.

FIG. 4 illustrates the pedestrian airbag device 20 in FIG. 3 and components around the pedestrian airbag device 20. FIG. 4 illustrates the pedestrian airbag device 20 as viewed from the left side of the automobile 1.

As illustrated in FIG. 4, the pedestrian airbag device 20 includes the case 24 that is elongated in the width direction of the automobile 1. The case 24 has a bottom, a front side, a rear side, a left side, and a right side. The case 24 has a box shape with an open top.

The case 24 that is elongated in the width direction of the automobile 1 is provided below the hood 4 between the hood 4 and the windshield 5. When the rear edge of the hood 4 and the front edge of the windshield 5 are curved along the vehicle width direction, the case 24 may also be curved along the vehicle width direction so as to conform to the curves of the rear edge of the hood 4 and the front edge of the windshield 5. The case 24 may be provided such that the entire case 24 hides below the hood 4 or such that part of the case 24 is exposed between the hood 4 and the windshield 5. The hood 4 may be configured such that its rear edge side is lifted before the bag 23 deploys. Since the rear edge side of the hood 4 is lifted, the bag 23 stored in the case 24 can easily deploy from the space between the case 24 and the hood 4. A cover member 8 that closes the upper opening of the case 24 is provided on the case 24 that is elongated in the width direction of the automobile 1. The bag 23 is stored in a folded state in the case 24. For example, the middle transverse deployment portion 30 etc. of the bag 23 are stored in a folded state in the case 24. The middle transverse deployment portion 30 is configured to deploy in the vehicle width direction. The left rearward deployment portion 32 and the right rearward deployment portion 31 of the bag 23 may be stored in a folded state on top of the folded middle transverse deployment portion 30 etc. The left rearward deployment portion 32 and the right rearward deployment portion 31 are configured to deploy rearward. In this case, the left rearward deployment portion 32 and the right rearward deployment portion 31 may be folded in more layers than the middle transverse deployment portion 30 and stored. Deployment of a portion of the bag 23 that is folded a large number of times tends to be delayed with respect to deployment of a portion of the bag 23 that is folded a small number of times.

The left inflator 22 and the right inflator 21 are arranged side by side in the vehicle width direction inside the case 24. The left inflator 22 is disposed to the left of the right inflator 21. The left inflator 22 and the right inflator 21 are installed inside the bag 23. The left inflator 22 and the right inflator 21 are screwed to a vehicle body structure 7 such as a bracket or a stay of the automobile 1. The bag 23 and the case 24 are interposed between the vehicle body structure 7 and the right and left inflators 21, 22.

Deployed State of Bag

The bag 23 of the first embodiment has a first right standing deployment portion 35 and a first left standing deployment portion 36 as right and left standing deployment portions, in addition to a generally U-shaped deployment portion formed by the middle transverse deployment portion 30, the left rearward deployment portion 32, and the right rearward deployment portion 31.

Figure 5:
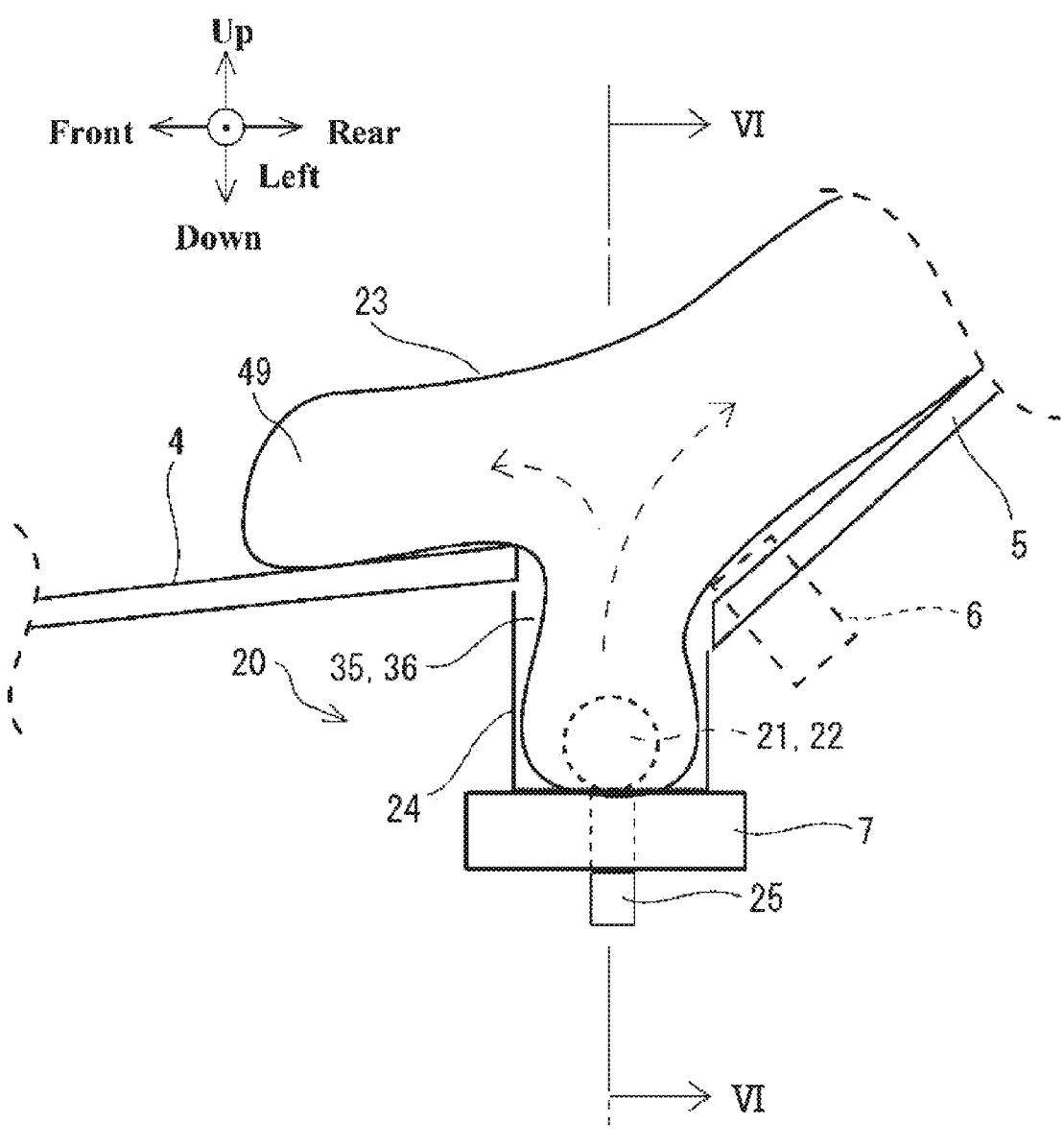
FIG. 5 illustrates a bag in FIG. 4 in a deployed state.

FIG. 5 illustrates the bag 23 in FIG. 4 in a deployed state. The pedestrian airbag device 20 of the automobile 1 deploys the bag 23 from between the hood 4 and the windshield 5 of the automobile 1. The cover member 8 in FIG. 4 may be broken or blown off by the deployment pressure of the bag 23. The bag 23 deploys onto the area from the rear end portion of the hood 4 to the front of the windshield 5. Unlike in FIG. 5, the hood 4 may be lifted upon activation of the pedestrian airbag device 20 in order to secure a space between the hood 4 and the windshield 5. In this case, the height position of the rear edge of the hood 4 at the time of deployment of the bag 23 is higher than its normal height position when the bag 23 is not deployed.

Figure 6:
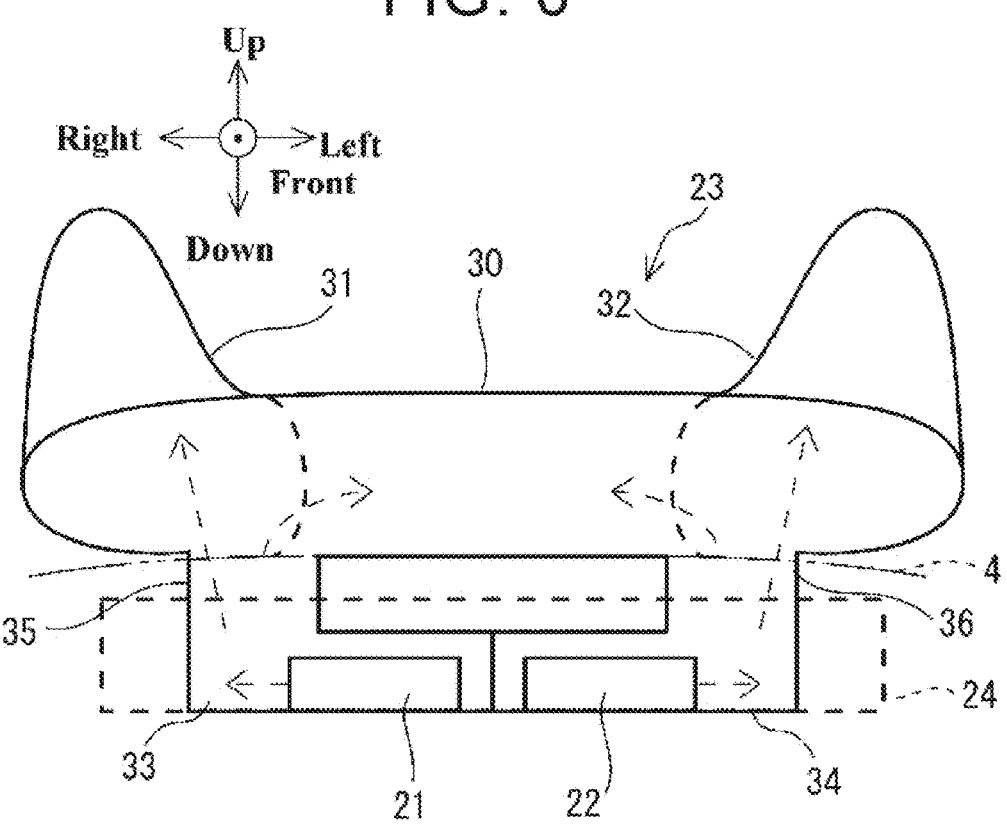
FIG. 6 illustrates a cross-section of the deployed bag in FIG. 5 as viewed from the direction of arrows VI-VI in FIG. 5.

FIG. 6 illustrates a cross-section of the deployed bag 23 in FIG. 5 as viewed from the direction of arrows VI-VI in FIG. 5. As illustrated in FIG. 6, the bag 23 has the middle transverse deployment portion 30, the left rearward deployment portion 32, the right rearward deployment portion 31, a left fixed deployment portion 34, a right fixed deployment portion 33, the first left standing deployment portion 36, and the first right standing deployment portion 35. In FIG. 6, the upper surface of the hood 4 is illustrated by a long dashed double-short dashed line, and the case 24 is illustrated by a dashed line. FIG. 6 illustrates the bag 23 fully deployed by high-pressure gas. In one embodiment of the present disclosure, the left fixed deployment portion 34 may serve as a left fixed portion. In one embodiment of the present disclosure, the right fixed deployment portion 33 may serve as a right fixed portion.

The left inflator 22 is housed in the left fixed deployment portion 34. As illustrated in FIG. 5, the left fixed deployment portion 34 is sandwiched between the left inflator 22 and the vehicle body structure 7 of the automobile 1 and fixed to the vehicle body 2 of the automobile 1. Part of the left inflator 22 may be housed in the left fixed deployment portion 34 by inserting the left inflator 22 into a hole in the left fixed deployment portion 34. The left fixed deployment portion 34 is thus coupled to the left inflator 22 and fixed to the bottom of the case 24.

The right inflator 21 is housed in the right fixed deployment portion 33. As illustrated in FIG. 5, the right fixed deployment portion 33 is located to the right of the left fixed deployment portion 34, and is sandwiched between the right inflator 21 and the vehicle body structure 7 of the automobile 1 and fixed to the vehicle body 2 of the automobile 1. Part of the right inflator 21 may be housed in the right fixed deployment portion 33 by inserting the right inflator 21 into a hole in the right fixed deployment portion 33. The right fixed deployment portion 33 is thus coupled to the right inflator 21 and fixed to the bottom of the case 24.

The middle transverse deployment portion 30 is a portion of the bag 23 that deploys long in the vehicle width direction. The middle transverse deployment portion 30 deploys in the vehicle width direction from above the hood 4 to the windshield 5 so as to close the space between the hood 4 and the windshield 5.

The left rearward deployment portion 32 is connected with the left end of the middle transverse deployment portion 30 in the vehicle width direction. The left rearward deployment portion 32 deploys rearward along the left A-pillar 9 at the windshield 5. The left rearward deployment portion 32 can thus deploy rearward from the left end of the middle transverse deployment portion 30 along the left edge of the windshield 5 in the vehicle width direction.

The right rearward deployment portion 31 is connected with the right end of the middle transverse deployment portion 30 in the vehicle width direction. The right rearward deployment portion 31 deploys rearward along the right A-pillar 9 at the windshield 5. The middle transverse deployment portion 30, the left rearward deployment portion 32, and the right rearward deployment portion 31 form a single air chamber through which high-pressure gas can move among these portions. As described above, the right rearward deployment portion 31 can deploy rearward from the right end of the middle transverse deployment portion 30 along the right edge of the windshield 5 in the vehicle width direction.

The right rearward deployment portion 31 and the left rearward deployment portion 32 are respectively connected with the right and left sides of the middle transverse deployment portion 30 of the bag 23 in the vehicle width direction. The middle transverse deployment portion 30, the left rearward deployment portion 32, and the right rearward deployment portion 31 may be formed by bonding base fabrics each having a corresponding deployed shape, or may be formed by bonding a combination of base fabrics having other shapes. For example, a base fabric that deploys along the entire width of the automobile 1 may be bonded to base fabrics that deploy rearward on the right and left sides. Even in this case, the middle transverse deployment portion 30 is a portion to be present on the middle part of the front edge of the windshield 5. The right rearward deployment portion 31 and the left rearward deployment portion 32 are connected with the right and left sides of the middle transverse deployment portion 30, respectively. The left rearward deployment portion 32 is a portion that is disposed to the left of the middle transverse deployment portion 30 and that is to be present along the left A-pillar 9 at the windshield 5. The right rearward deployment portion 31 is a portion that is disposed to the right of the middle transverse deployment portion 30 and that is to be present along the right A-pillar 9 at the windshield 5. For example, in the case of FIG. 6, the middle transverse deployment portion 30 is a portion between the right and left dashed lines in FIG. 6 out of the portion of the bag 23 that deploys in the vehicle width direction. The left rearward deployment portion 32 is composed of a portion to the left of the middle transverse deployment portion 30 and a portion that deploys rearward on the left side. The right rearward deployment portion 31 is composed of a portion to the right of the middle transverse deployment portion 30 and a portion that deploys rearward on the right side. The boundary between the middle transverse deployment portion 30 and the left rearward deployment portion 32 and the boundary between the middle transverse deployment portion 30 and the right rearward deployment portion 31 may be different from those illustrated in FIG. 6. For example, the boundary between the middle transverse deployment portion 30 and the left rearward deployment portion 32 and the boundary between the middle transverse deployment portion 30 and the right rearward deployment portion 31 may be cross-sections along the front-rear direction of the automobile 1.

The first left standing deployment portion 36 deploys in the up-down direction of the automobile 1. The first left standing deployment portion 36 connects the middle transverse deployment portion 30 and the left rearward deployment portion 32 to the left fixed deployment portion 34. The first left standing deployment portion 36 is connected with the left rearward deployment portion 32 and the middle transverse deployment portion 30 in the range from the left rearward deployment portion 32 to the connection portion between the left rearward deployment portion 32 and the middle transverse deployment portion 30. The first left standing deployment portion 36 is connected mainly with the left rearward deployment portion 32 out of the middle transverse deployment portion 30 and the left rearward deployment portion 32.

The first right standing deployment portion 35 deploys in the up-down direction of the automobile 1. The first right standing deployment portion 35 connects the middle transverse deployment portion 30 and the right rearward deployment portion 31 to the right fixed deployment portion 33. The first right standing deployment portion 35 is connected with the right rearward deployment portion 31 and the middle transverse deployment portion 30 in the range from the right rearward deployment portion 31 to the connection portion between the right rearward deployment portion 31 and the middle transverse deployment portion 30. The first right standing deployment portion 35 is connected mainly with the right rearward deployment portion 31 out of the middle transverse deployment portion 30 and the right rearward deployment portion 31.

The first left standing deployment portion 36 and the first right standing deployment portion 35 are portions of the bag 23, and these portions deploy so as to stand inside the case 24. The first left standing deployment portion 36 and the first right standing deployment portion 35 deploy to a height equal to or higher than the height position of the upper surface of the hood 4 at the time of deployment of the bag 23. In this case, the upper end of the first left standing deployment portion 36 and the upper end of the first right standing deployment portion 35 deploy above the upper surface of the hood 4. This allows the middle transverse deployment portion 30, the left rearward deployment portion 32, and the right rearward deployment portion 31 to deploy above the upper surface of the hood 4. As described above, the first left standing deployment portion 36 and the first right standing deployment portion 35 deploy so as to protrude upward from the case 24. This allows the middle transverse deployment portion 30, the left rearward deployment portion 32, and the right rearward deployment portion 31 to deploy from a position away from the upper edge of the case 24 in the upward direction. As illustrated in FIG. 5, the bag 23 of the first embodiment has the front deployment portion 49 that deploys onto the hood 4 at the time of deployment of the bag 23. The front deployment portion 49 is portions of the middle transverse deployment portion 30, the left rearward deployment portion 32, and the right rearward deployment portion 31 that deploy forward of the case 24. The front deployment portion 49 deploys so as to protrude forward beyond the front wall of the case 24. The front deployment portion 49 thus deploys onto the hood 4 at the time of deployment of the bag 23. As described above, even when the bag 23 has the front deployment portion 49, the middle transverse deployment portion 30, the left rearward deployment portion 32, and the right rearward deployment portion 31 deploy above the hood 4. Therefore, the bag 23 can deploy into a desired shape without being obstructed by the hood 4.

As illustrated in FIGS. 5 and 6, the cross-sections of channels through which high-pressure gas flows during deployment of the first left standing deployment portion 36 and the first right standing deployment portion 35 are smaller than the cross-sectional size of the case 24. The channel cross-section of the first left standing deployment portion 36 may be a cross-section of the fully deployed first left standing deployment portion 36 cut perpendicularly to the direction in which the first left standing deployment portion 36 in the deployed state extends. The channel cross-section of the first right standing deployment portion 35 may be a cross-section of the fully deployed first right standing deployment portion 35 cut perpendicularly to the direction in which the first right standing deployment portion 35 in the deployed state extends. In this case, the total area of the channel cross-section of the first left standing deployment portion 36 along the vertical direction and the channel cross-section of the first right standing deployment portion 35 along the vertical direction is smaller than the cross-sectional size of the case 24. Alternatively, the channel cross-section of the first left standing deployment portion 36 may be a cross-section of the fully deployed first left standing deployment portion 36 cut horizontally together with the case 24. The channel cross-section of the first right standing deployment portion 35 may be a cross-section of the fully deployed first right standing deployment portion 35 cut horizontally together with the case 24. The total area of the channel cross-section of the first left standing deployment portion 36 along the horizontal direction and the channel cross-section of the first right standing deployment portion 35 along the horizontal direction is smaller than the cross-sectional size of the case 24. The first left standing deployment portion 36 and the first right standing deployment portion 35 therefore do not deploy to a cross-section larger than that of the case 24. This reduces deformation and breakage of the case 24. As illustrated in FIG. 5, vehicle equipment such as a wiper motor 6 is disposed around the case 24. When the case 24 is deformed by deployment of the bag 23, an external force may be applied to the vehicle equipment such as the wiper motor 6. The first embodiment can reduce the possibility of occurrence of such a situation.

In the first embodiment, the left inflator 22 releases high-pressure gas to the left as illustrated by a dashed arrow in FIG. 6. The high-pressure gas released into the bag 23 then flows through the first left standing deployment portion 36 mainly into the left rearward deployment portion 32 out of the middle transverse deployment portion 30 and the left rearward deployment portion 32. Since the high-pressure gas having a high pressure immediately after deployment thus flows preferentially into the left rearward deployment portion 32, the left rearward deployment portion 32 folded in multiple layers in the case 24 can efficiently deploy rearward. As illustrated in FIG. 6, the right inflator 21 releases high-pressure gas to the right. The high-pressure gas released into the bag 23 then flows through the first right standing deployment portion 35 mainly into the right rearward deployment portion 31 out of the middle transverse deployment portion 30 and the right rearward deployment portion 31. Since the high-pressure gas having a high pressure immediately after deployment thus flows preferentially into the right rearward deployment portion 31, the right rearward deployment portion 31 folded in multiple layers in the case 24 can efficiently deploy rearward. The left rearward deployment portion 32 and the right rearward deployment portion 31 can thus deploy into their desired shapes immediately after the deployment is started. The left rearward deployment portion 32 and the right rearward deployment portion 31 can immediately deploy into their desired shapes without significant delay with respect to the middle transverse deployment portion 30.

As illustrated by a dashed arrow in FIG. 6, the high-pressure gas flowing from the left inflator 22 into the middle transverse deployment portion 30 flows to the right in the middle transverse deployment portion 30. The high-pressure gas flowing from the right inflator 21 into the middle transverse deployment portion 30 flows to the left in the middle transverse deployment portion 30. In the middle transverse deployment portion 30, the rightward flow of the high-pressure gas from the left inflator 22 and the leftward flow of the high-pressure gas from the right inflator 21 cancel each other out. As a result, the flow of the high-pressure gas from the middle transverse deployment portion 30 toward the left rearward deployment portion 32 and the flow of the high-pressure gas from the middle transverse deployment portion 30 toward the right rearward deployment portion 31 are weakened. Since the outward flows of the high-pressure gas are weakened, the left rearward deployment portion 32 is less likely to deploy outward to the left, and the right rearward deployment portion 31 is less likely to deploy outward to the right. The left rearward deployment portion 32 and the right rearward deployment portion 31 are also less likely to flap during deployment.

Due to these effects, the left rearward deployment portion 32 and the right rearward deployment portion 31 of the first embodiment deploy rearward mainly by the rearward flow of the high-pressure gas rather than by the flow of the high-pressure gas in the vehicle width direction. The left rearward deployment portion 32 and the right rearward deployment portion 31 can thus deploy into the desired state, namely the state in which the left rearward deployment portion 32 overlaps the left A-pillar 9 and the right rearward deployment portion 31 overlaps the right A-pillar 9. Moreover, when deployment of the bag 23 is started, the entire bag 23 can quickly deployed into the desired U-shape so as to cover the area from the rear end portion of the hood 4 and the right and left A-pillars 9 at the windshield 5.

Effects

As described above, in the first embodiment, the first left standing deployment portion 36 is connected with at least the left rearward deployment portion 32 out of the middle transverse deployment portion 30 and the left rearward deployment portion 32. As a result, the high-pressure gas from the left inflator 22 flows preferentially into the left rearward deployment portion 32. The rearward deployment speed of the left rearward deployment portion 32 is thus improved, and the left rearward deployment portion 32 can deploy into a desired shape immediately after the deployment is started. The first right standing deployment portion 35 is connected with at least the right rearward deployment portion 31 out of the middle transverse deployment portion 30 and the right rearward deployment portion 31. As a result, the high-pressure gas from the right inflator 21 flows preferentially into the right rearward deployment portion 31. The rearward deployment speed of the right rearward deployment portion 31 is thus improved, and the right rearward deployment portion 31 can deploy into a desired shape immediately after the deployment is started. As a result, the entire middle transverse deployment portion 30 including the first left standing deployment portion 36 and the first right standing deployment portion 35 of the bag 23 of the first embodiment can immediately deploy into a desired shape.

On the other hand, when the left inflator and the right inflator are coupled to the middle transverse deployment portion alone, the middle transverse deployment portion of the bag deploys first, and high-pressure gas is introduced into the left rearward deployment portion and the right rearward deployment portion through the middle transverse deployment portion. As a result, the rearward deployment of the left rearward deployment portion and the right rearward deployment portion may be delayed. The high-pressure gas that flows from the middle transverse deployment portion that deploys first to the left rearward deployment portion and the right rearward deployment portion basically tends to flow outward in the vehicle width direction. The flow of the high-pressure gas in the front-rear direction is less likely to enter the left rearward deployment portion and the right rearward deployment portion. Therefore, each of these rearward deployment portions deploys by repeating a process in which its front part deploys first and then its rear part deploys. As a result, the deployment of these rearward deployment portions tends to be delayed. Moreover, the middle transverse deployment portion has already deployed when the left rearward deployment portion and the right rearward deployment portion deploy. Therefore, the left rearward deployment portion and the right rearward deployment portion tend to deploy outward and tend to flap during deployment. The first embodiment can effectively reduce delay in deployment of the left rearward deployment portion 32 or the right rearward deployment portion 31, and can also effectively reduce a deviation in deployed position and flapping during deployment of the left rearward deployment portion 32 or the right rearward deployment portion 31.

Furthermore, in the first embodiment, the first left standing deployment portion 36 and the first right standing deployment portion 35 deploy inside the case 24 that stores the bag 23. The first left standing deployment portion 36 and the first right standing deployment portion 35 deploy so as to protrude upward from the case 24 and reach above the upper surface of the hood 4. This allows the middle transverse deployment portion 30, the left rearward deployment portion 32, and the right rearward deployment portion 31 to deploy above the case 24 from a position away from at least the upper edge of the case 24 in the upward direction. That is, the first left standing deployment portion 36 and the first right standing deployment portion 35 deploy inside the case 24. The middle transverse deployment portion 30, the left rearward deployment portion 32, and the right rearward deployment portion 31 that have relatively large deployed volumes do not deploy inside the case 24. Moreover, in the first embodiment, each of the first left standing deployment portion 36 and the first right standing deployment portion 35 that deploy inside the case 24 deploys with a smaller channel cross-section than the cross-sectional size of the case 24. The deploying bag 23 is therefore less likely to deform or damage the case 24. This reduces breakage of the case 24 and the components around the case 24 of the automobile 1 by the deployment of the bag 23. By limiting the deployed size of the bag 23 inside the case 24 in this manner, the high-pressure gas from the left inflator 22 and the right inflator 21 is more likely to be used for deployment of the middle transverse deployment portion 30, the left rearward deployment portion 32, and the right rearward deployment portion 31. The middle transverse deployment portion 30, the left rearward deployment portion 32, and the right rearward deployment portion 31 can thus deploy satisfactorily and quickly compared to a case where the bag 23 deforms or damages the case 24.

In the first embodiment, the bag has separate standing deployment portions on the right and left sides, namely the first right standing deployment portion 35 and the first left standing deployment portion 36, rather than a single standing deployment portion. Accordingly, as in a case where a portion of the bag 23 that deploys into a generally U-shape is directly fixed to the case, the position and attitude of the deployed bag 23 are more likely to be maintained even when a load is applied to the bag 23 due to contact with a pedestrian.

As described above, the first embodiment can be expected to improve the pedestrian protection performance as the bag 23 quickly deploys into a desired shape.

In the first embodiment, the first left standing deployment portion 36 and the first right standing deployment portion 35 of the bag 23 deploy so as to protrude upward from the case 24. This allows the first left standing deployment portion 36 and the first right standing deployment portion 35 of the bag 23 to deploy above the upper surface of the hood 4 at the time of deployment of the bag 23. The hood 4 is therefore less likely to obstruct the deployment of the front deployment portion 49 of the middle transverse deployment portion 30, left rearward deployment portion 32, and right rearward deployment portion 31. The front deployment portion 49 deploys forward of the case 24. The front deployment portion 49 can thus deploy onto the hood 4 at the time of deployment of the bag 23. The front deployment portion 49 can cover the area from the hood 4 of the vehicle body 2 to the windshield 5. The bag 23 can cover the rear edge portion of the hood 4 and the space between the hood 4 at the time of deployment of the bag 23 and the windshield 5. This can improve the pedestrian protection performance.

Second Embodiment

Overview

Next, the pedestrian protection device 10 for the automobile 1 according to a second embodiment of the present disclosure will be described. In the first embodiment, the first left standing deployment portion 36 and the first right standing deployment portion 35 deploy in the up-down direction of the automobile 1. The first left standing deployment portion 36 is connected with both the middle transverse deployment portion 30 and the left rearward deployment portion 32. The first right standing deployment portion 35 is connected with both the middle transverse deployment portion 30 and the right rearward deployment portion 31. The high-pressure gas from the left inflator 22 and the right inflator 21 can therefore flow preferentially into the left rearward deployment portion 32 and the right rearward deployment portion 31, respectively, over into the middle transverse deployment portion 30. The first embodiment provides a pedestrian protection function. However, there may be room for improvement depending on how the first left standing deployment portion 36 and the first right standing deployment portion 35 are provided. Examples of the improvement include reduction in delay in deployment of the left rearward deployment portion 32 and the right rearward deployment portion 31 with respect to deployment of the middle transverse deployment portion 30 and reduction in time it takes for the deployment of the left rearward deployment portion 32 and the right rearward deployment portion 31 to stabilize. An example of a measure to achieve such improvement will be described in the second embodiment. In the second embodiment, a first left standing deployment portion 42 is connected with the left rearward deployment portion 32 out of the middle transverse deployment portion 30 and the left rearward deployment portion 32. A first right standing deployment portion 41 is connected with the right rearward deployment portion 31 out of the middle transverse deployment portion 30 and the right rearward deployment portion 31. In this case, the high-pressure gas is more likely to flow more preferentially into the left rearward deployment portion 32 and the right rearward deployment portion 31 over into the middle transverse deployment portion 30. This allows the left rearward deployment portion 32 and the right rearward deployment portion 31 to deploy more preferentially over the middle transverse deployment portion 30. Hereinafter, the second embodiment will be described with reference to the drawings. In the second embodiment, the same components as those in the first embodiment are denoted by the same signs, and illustration and description thereof will be omitted. The following description focuses on the differences of the second embodiment from the first embodiment.

Deployed State of Bag

Figure 7:
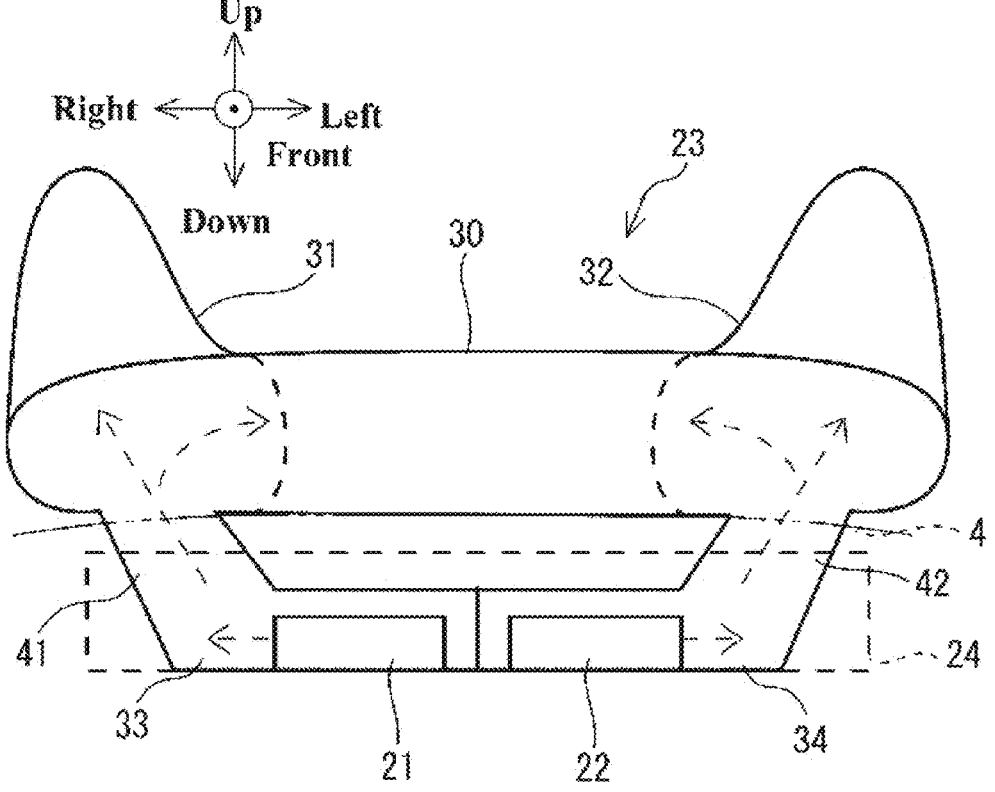
FIG. 7 illustrates a cross-section of a deployed bag of a pedestrian airbag device according to a second embodiment of the present disclosure as viewed from the same direction as in FIG. 6.

FIG. 7 illustrates a cross-section of the deployed bag 23 of the pedestrian airbag device 20 according to the second embodiment of the present disclosure as viewed from the same direction as in FIG. 6. In FIG. 7, the pedestrian airbag device 20 is viewed in cross-section along the same direction as in FIG. 6. In FIG. 7, the upper surface of the hood 4 is illustrated by a long dashed double-short dashed line, and the case 24 is illustrated by a dashed line. FIG. 7 illustrates the bag 23 fully deployed by high-pressure gas. The bag 23 deploys as illustrated in FIG. 7 from the same state as that in FIG. 4. Like the bag 23 in FIG. 5, the bag 23 includes the front deployment portion 49.

In the second embodiment, the first left standing deployment portion 42 deploys so as to stand obliquely in the upper left direction inside the case 24. The first left standing deployment portion 42 is connected with the left rearward deployment portion 32. A first right standing deployment portion 41 deploys so as to stand obliquely in the upper right direction inside the case 24. The first right standing deployment portion 41 is connected with the right rearward deployment portion 31. The left inflator 22 is provided inside the left fixed deployment portion 34. The left inflator 22 is coupled to the left fixed deployment portion 34 and fixed to the bottom of the case 24. The right inflator 21 is provided inside the right fixed deployment portion 33. The right inflator 21 is coupled to the right fixed deployment portion 33 and fixed to the bottom of the case 24.

As illustrated in FIG. 7, each of the first left standing deployment portion 42 and the first right standing deployment portion 41 deploys with a smaller channel cross-section than the cross-sectional size of the case 24. The first left standing deployment portion 42 and the first right standing deployment portion 41 deploy to a height equal to or higher than the height position of the upper surface of the hood 4 at the time of deployment of the bag 23. The first left standing deployment portion 42 and the first right standing deployment portion 41 are therefore less likely to deform or break the case 24 when they deploy. As illustrated in FIG. 5, vehicle equipment such as the wiper motor 6 is disposed around the case 24. When the case 24 is deformed by deployment of the bag 23, an external force may be applied to the vehicle equipment such as the wiper motor 6. The second embodiment can reduce the possibility of occurrence of such a situation.

As illustrated in FIG. 7, the first left standing deployment portion 42 is connected with the left rearward deployment portion 32 out of the middle transverse deployment portion 30 and the left rearward deployment portion 32. As illustrated in FIG. 7, the first right standing deployment portion 41 is connected with the right rearward deployment portion 31 out of the middle transverse deployment portion 30 and the right rearward deployment portion 31. The first left standing deployment portion 42 and the first right standing deployment portion 41 deploy to a height equal to or higher than the height position of the upper surface of the hood 4. This allows the middle transverse deployment portion 30, the left rearward deployment portion 32, and the right rearward deployment portion 31 to deploy above the upper surface of the hood 4. As described above, the first left standing deployment portion 42 deploys to above the upper edge of the case 24. The middle transverse deployment portion 30 and the left rearward deployment portion 32 can therefore deploy upward and away from the upper edge of the case 24. The first right standing deployment portion 41 also deploys to above the upper edge of the case 24. The middle transverse deployment portion 30 and the right rearward deployment portion 31 can therefore deploy upward and away from the upper edge of the case 24.

In the second embodiment, the left inflator 22 releases high-pressure gas to the left as illustrated in FIG. 7. The high-pressure gas released into the bag 23 then flows smoothly in the upper left direction into the left rearward deployment portion 32 without stagnating in the oblique first left standing deployment portion 42. Since the high-pressure gas having a high pressure thus flows preferentially into the left rearward deployment portion 32, the left rearward deployment portion 32 folded in multiple layers in the case 24 can efficiently and quickly deploy rearward. As illustrated in FIG. 7, the right inflator 21 releases high-pressure gas to the right. The high-pressure gas released into the bag 23 then flows smoothly in the upper right direction into the right rearward deployment portion 31 without stagnating in the oblique first right standing deployment portion 41. Since the high-pressure gas having a high pressure thus flows preferentially into the right rearward deployment portion 31, the right rearward deployment portion 31 folded in multiple layers in the case 24 can efficiently and quickly deploy rearward. As a result, the left rearward deployment portion 32 and the right rearward deployment portion 31 can deploy without significant delay with respect to the middle transverse deployment portion 30, and the bag 23 can immediately deploy into a desired shape.

The high-pressure gas flowing from the left inflator 22 into the middle transverse deployment portion 30 flows to the right in the middle transverse deployment portion 30. The high-pressure gas flowing from the right inflator 21 into the middle transverse deployment portion 30 flows to the left in the middle transverse deployment portion 30. In the middle transverse deployment portion 30, the rightward flow of the high-pressure gas from the left inflator 22 and the leftward flow of the high-pressure gas from the right inflator 21 cancel each other out. As a result, the flow of the high-pressure gas from the middle transverse deployment portion 30 toward the left rearward deployment portion 32 and the flow of the high-pressure gas from the middle transverse deployment portion 30 toward the right rearward deployment portion 31 are weakened. Since the outward flows of the high-pressure gas are weakened, the left rearward deployment portion 32 is less likely to deploy outward to the left, and the right rearward deployment portion 31 is less likely to deploy outward to the right. The left rearward deployment portion 32 and the right rearward deployment portion 31 are also less likely to flap during deployment.

Due to these effects, the left rearward deployment portion 32 and the right rearward deployment portion 31 of the second embodiment can deploy so as to quickly stabilize in a desired state, namely a state in which the left rearward deployment portion 32 overlaps the left A-pillar 9 and the right rearward deployment portion 31 overlaps the right A-pillar 9. Once deployment of the bag 23 is started, the entire bag 23 can quickly deploy into a desired U-shape in the desired state, namely in the state in which the bag 23 overlaps the right and left A-pillars 9.

Effects

As described above, in the second embodiment, the first left standing deployment portion 42 coupled to the left inflator 22 and fixed to the bottom of the case 24 is connected with the left rearward deployment portion 32 out of the left rearward deployment portion 32 and the middle transverse deployment portion 30. The first left standing deployment portion 42 deploys obliquely in the upper left direction inside the case 24. The first left standing deployment portion 42 that deploys obliquely in the upper left direction is less likely to obstruct the flow of the high-pressure gas released to the left from the left inflator 22. This allows the high-pressure gas released from the left inflator 22 to flow smoothly into the left rearward deployment portion 32. The left rearward deployment portion 32 can thus efficiently deploy due to the high-pressure gas having a high pressure from the left inflator 22. The first right standing deployment portion 41 coupled to the right inflator 21 and fixed to the bottom of the case 24 is connected with the right rearward deployment portion 31 out of the right rearward deployment portion 31 and the middle transverse deployment portion 30. The first right standing deployment portion 41 deploys obliquely in the upper right direction inside the case 24. The first right standing deployment portion 41 that deploys obliquely in the upper right direction is less likely to obstruct the flow of the high-pressure gas released to the right from the right inflator 21. This allows the high-pressure gas released to the right from the right inflator 21 to flow smoothly into the right rearward deployment portion 31. The right rearward deployment portion 31 can thus efficiently deploy due to the high-pressure gas having a high pressure from the right inflator 21.

As described above, the second embodiment can be expected to improve the pedestrian protection performance as the bag 23 quickly deploys into a desired shape.

Third Embodiment

Overview

Next, the pedestrian protection device 10 for the automobile 1 according to a third embodiment of the present disclosure will be described. In the first and second embodiments, there is one standing deployment portion on each of the right and left sides. In this case, there may be a situation where deployment of the middle transverse deployment portion 30 is delayed because the left rearward deployment portion 32 and the right rearward deployment portion 31 are caused to deploy preferentially over the middle transverse deployment portion 30. An example of a measure against such a situation will be described in the third embodiment. In the third embodiment, a plurality of standing deployment portions is provided on each of the right and left sides. The third embodiment can thus reduce delay in deployment of the middle transverse deployment portion 30 in, for example, the situation where deployment of the middle transverse deployment portion 30 is delayed. Hereinafter, the third embodiment will be described with reference to the drawings. In the third embodiment, the same components as those in the first and second embodiments are denoted by the same signs, and illustration and description thereof will be omitted. The following description focuses on the differences of the third embodiment from the first and second embodiments.

Deployed State of Bag

Figure 8:
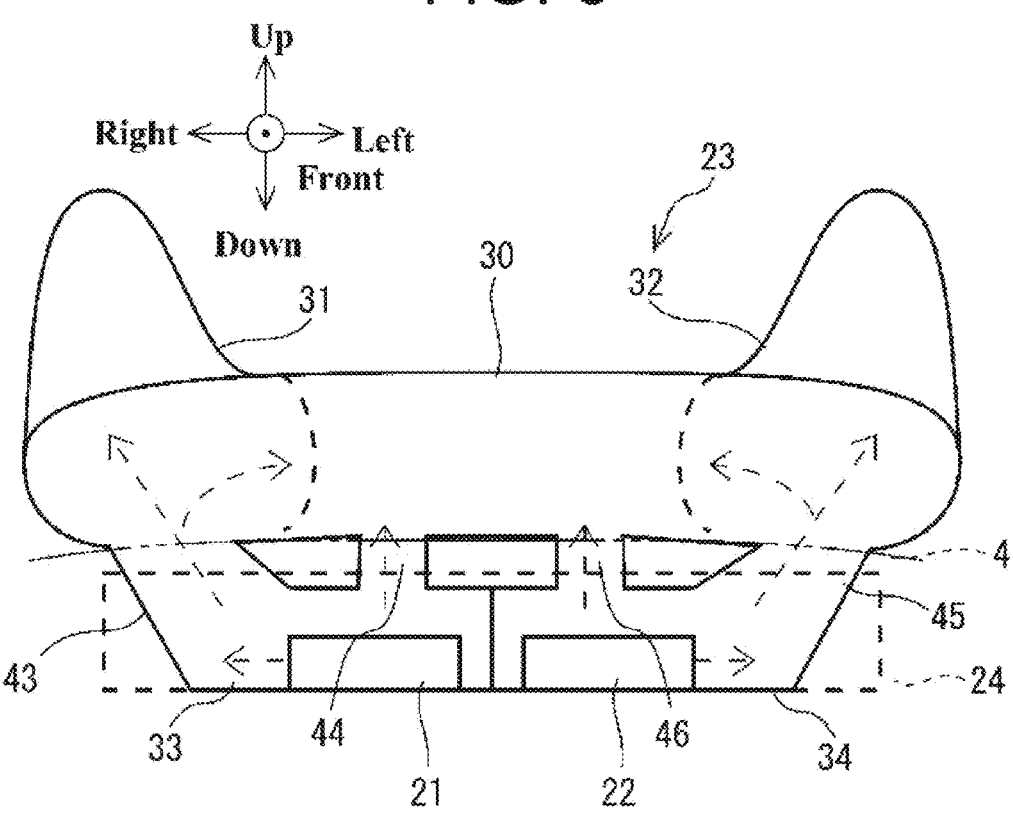
FIG. 8 illustrates a cross-section of a deployed bag of a pedestrian airbag device according to a third embodiment of the present disclosure as viewed from the same direction as in FIG. 6.

FIG. 8 illustrates a cross-section of the deployed bag 23 of the pedestrian airbag device 20 according to the third embodiment of the present disclosure as viewed from the same direction as in FIG. 6. In FIG. 8, the pedestrian airbag device 20 is viewed in cross-section along the same direction as in FIG. 6. In FIG. 8, the upper surface of the hood 4 is illustrated by a long dashed double-short dashed line, and the case 24 is illustrated by a dashed line. FIG. 8 illustrates the bag 23 fully deployed by high-pressure gas. The bag 23 deploys as illustrated in FIG. 8 from the same state as that in FIG. 4. Like the bag 23 in FIG. 5, the bag 23 includes the front deployment portion 49.

In the third embodiment, the bag 23 has a first left standing deployment portion 45 and a second left standing deployment portion 46. The first left standing deployment portion 45 deploys obliquely in the upper left direction inside the case 24. The first left standing deployment portion 45 connects the left rearward deployment portion 32 and the left fixed deployment portion 34. The second left standing deployment portion 46 deploys in the up-down direction at a position closer to the middle of the automobile 1 in the vehicle width direction than the first left standing deployment portion 45. The second left standing deployment portion 46 connects the middle transverse deployment portion 30 and the left fixed deployment portion 34. The second left standing deployment portion 46 deploys with a smaller channel cross-section than the first left standing deployment portion 45. The high-pressure gas therefore flows preferentially into the left rearward deployment portion 32 over into the middle transverse deployment portion 30.

In the third embodiment, the bag 23 has a first right standing deployment portion 43 and a second right standing deployment portion 44. The first right standing deployment portion 43 deploys obliquely in the upper right direction inside the case 24. The first right standing deployment portion 43 connects the right rearward deployment portion 31 and the right fixed deployment portion 33. The second right standing deployment portion 44 deploys in the up-down direction at a position closer to the middle of the automobile 1 in the vehicle width direction than the first right standing deployment portion 43. The second right standing deployment portion 44 connects the middle transverse deployment portion 30 and the right fixed deployment portion 33. The second right standing deployment portion 44 deploys with a smaller channel cross-section than the first right standing deployment portion 43. The high-pressure gas therefore flows preferentially into the right rearward deployment portion 31 over into the middle transverse deployment portion 30.

As illustrated in FIG. 8, each of the first left standing deployment portion 45, the second left standing deployment portion 46, the first right standing deployment portion 43, and the second right standing deployment portion 44 deploys with a smaller channel cross-section than the cross-sectional size of the case 24. The total area of these four channel cross-sections is smaller than the cross-sectional size of the case 24. The first left standing deployment portion 45, the second left standing deployment portion 46, the first right standing deployment portion 43, and the second right standing deployment portion 44 are therefore less likely to deform or break the case 24 when they deploy. As illustrated in FIG. 5, vehicle equipment such as the wiper motor 6 is disposed around the case 24. When the case 24 is deformed by deployment of the bag 23, an external force may be applied to the vehicle equipment such as the wiper motor 6. The third embodiment can reduce the possibility of occurrence of such a situation.

Each of the first left standing deployment portion 45, the second left standing deployment portion 46, the first right standing deployment portion 43, and the second right standing deployment portion 44 deploys to a height equal to or higher than the height position of the upper surface of the hood 4 at the time of deployment of the bag 23. This allows the middle transverse deployment portion 30, the left rearward deployment portion 32, and the right rearward deployment portion 31 to deploy above the upper surface of the hood 4.

Moreover, in the third embodiment, the deployed height of the first left standing deployment portion 45 is lower than the deployed height of the second left standing deployment portion 46. The deployed height of the first right standing deployment portion 43 is lower than the deployed height of the second right standing deployment portion 44. As used herein, the "deployed height" may refer to the height position in the up-down direction that the bag 23 reaches during deployment. The middle transverse deployment portion 30, the left rearward deployment portion 32, and the right rearward deployment portion 31 can thus deploy so as to be entirely in close contact with the upper surface of the hood 4 having a curved shape with its right and left ends lower than the middle in the vehicle width direction as illustrated in FIG. 8. The middle transverse deployment portion 30, the left rearward deployment portion 32, and the right rearward deployment portion 31 are therefore more likely to receive a reaction force from the hood 4.

In the third embodiment, the left inflator 22 releases high-pressure gas to the left as illustrated in FIG. 8. The high-pressure gas then flows smoothly in the upper left direction into the first left standing deployment portion 45 and then into the left rearward deployment portion 32 without stagnating in the first left standing deployment portion 45. Since the high-pressure gas having a high pressure thus flows preferentially into the left rearward deployment portion 32, the left rearward deployment portion 32 folded in multiple layers in the case 24 can efficiently deploy rearward. As illustrated in FIG. 8, the right inflator 21 releases high-pressure gas to the right. The high-pressure gas then flows smoothly in the upper right direction into the first right standing deployment portion 43 and then into the right rearward deployment portion 31 without stagnating in the first right standing deployment portion 43. Since the high-pressure gas having a high pressure thus flows preferentially into the right rearward deployment portion 31, the right rearward deployment portion 31 folded in multiple layers in the case 24 can efficiently deploy rearward. As a result, the left rearward deployment portion 32 and the right rearward deployment portion 31 can deploy without significant delay with respect to the middle transverse deployment portion 30.

The high-pressure gas flowing from the left inflator 22 through the left rearward deployment portion 32 into the middle transverse deployment portion 30 flows to the right in the middle transverse deployment portion 30. The high-pressure gas flowing from the right inflator 21 through the right rearward deployment portion 31 into the middle transverse deployment portion 30 flows to the left in the middle transverse deployment portion 30. In the middle transverse deployment portion 30, the rightward flow of the high-pressure gas from the left inflator 22 and the leftward flow of the high-pressure gas from the right inflator 21 cancel each other out. The flow of the high-pressure gas from the middle transverse deployment portion 30 to the left rearward deployment portion 32 or the right rearward deployment portion 31 is weakened. The second left standing deployment portion 46 and the second right standing deployment portion 44 are directly connected with the middle transverse deployment portion 30. Therefore, the middle transverse deployment portion 30 can deploy without significant delay with respect to the left rearward deployment portion 32 and the right rearward deployment portion 31. Since the outward flows of the high-pressure gas are weakened, the left rearward deployment portion 32 is less likely to deploy outward to the left, and the right rearward deployment portion 31 is less likely to deploy outward to the right. The left rearward deployment portion 32 and the right rearward deployment portion 31 are also less likely to flap during deployment.

Due to these effects, the left rearward deployment portion 32 and the right rearward deployment portion 31 of the third embodiment can deploy so as to quickly stabilize in a desired state, namely a state in which the left rearward deployment portion 32 overlaps the left A-pillar 9 and the right rearward deployment portion 31 overlaps the right A-pillar 9. Once deployment of the bag 23 is started, the entire bag 23 can quickly deploy into a desired U-shape in the desired state, namely in the state in which the bag 23 overlaps the right and left A-pillars 9.

Effects

As described above, in the third embodiment, the left standing deployment portion is composed of the first left standing deployment portion 45 connected with the left rearward deployment portion 32, and the second left standing deployment portion 46 connected with the middle transverse deployment portion 30 at a position closer to the middle of the automobile 1 in the vehicle width direction than the first left standing deployment portion 45. The right standing deployment portion is composed of the first right standing deployment portion 43 connected with the right rearward deployment portion 31, and the second right standing deployment portion 44 connected with the middle transverse deployment portion 30 at a position closer to the middle of the automobile 1 in the vehicle width direction than the first right standing deployment portion 43. The second left standing deployment portion 46 has a smaller channel cross-section than the first left standing deployment portion 45, and the second right standing deployment portion 44 has a smaller channel cross-section than the first right standing deployment portion 43. Even in this case, the rearward deployment speed of the left rearward deployment portion 32 and the right rearward deployment portion 31 is improved, and the left rearward deployment portion 32 and the right rearward deployment portion 31 can deploy into their desired shapes immediately after the deployment is started. Delay in deployment of the middle transverse deployment portion 30 can also be reduced. As a result, the middle transverse deployment portion 30, the left rearward deployment portion 32, and the right rearward deployment portion 31 of the bag 23 of the third embodiment can immediately entirely deploy above the case 24 into their desired shapes. In the third embodiment, the first left standing deployment portion 45, the second left standing deployment portion 46, the first right standing deployment portion 43, and the second right standing deployment portion 44 deploy inside the case 24 that stores the bag 23. Moreover, the sum of the channel cross-sections of the first left standing deployment portion 45, the second left standing deployment portion 46, the first right standing deployment portion 43, and the second right standing deployment portion 44 is smaller than the cross-sectional size of the case 24. The deploying bag 23 is therefore less likely to deform or damage the case 24. This reduces breakage of the case 24 and the components around the case 24 of the automobile 1 by the deployment of the bag 23. By reducing an increase in deployed size of the bag 23 inside the case 24, the high-pressure gas from the left inflator 22 and the right inflator 21 is more likely to be used for deployment of the middle transverse deployment portion 30, the left rearward deployment portion 32, and the right rearward deployment portion 31. The middle transverse deployment portion 30, the left rearward deployment portion 32, and the right rearward deployment portion 31 can deploy satisfactorily and quickly compared to the case where the bag 23 deforms or damages the case 24.

In the third embodiment, the deployed height of the first left standing deployment portion 45 is lower than the deployed height of the second left standing deployment portion 46, and the deployed height of the first right standing deployment portion 43 is lower than the deployed height of the second right standing deployment portion 44. Accordingly, even when the middle transverse deployment portion 30 deploys, the right rearward deployment portion 31 with which the first right standing deployment portion 43 is connected and the left rearward deployment portion 32 with which the first left standing deployment portion 45 is connected are less likely to float from the hood 4 and the right and left A-pillars 9 at the sides of the windshield 5 in the vehicle width direction. When the middle transverse deployment portion 30 deploys, the right rearward deployment portion 31 and the left rearward deployment portion 32 can be pressed against the right and left A-pillars 9 and the hood 4 having a curved shape with its right and left ends lower than the middle in the vehicle width direction. The bag 23 can deploy such that the bag 23 covers between the hood 4 and the windshield 5 and covers the entire right and left A-pillars 9 when all of the middle transverse deployment portion 30, the right rearward deployment portion 31, and the left rearward deployment portion 32 are in the deployed state. Even if a load is applied to the bag 23 due to contact with a pedestrian, the bag 23 is more likely to maintain its deployed shape and state as it receives a reaction force from the hood 4 and the right and left A-pillars 9. The bag 23 can support a pedestrian who falls onto the bag 23.

The third embodiment can be expected to improve the pedestrian protection performance as the bag 23 quickly deploys into a desired state onto the vehicle body 2.

Fourth Embodiment

Overview

Next, the pedestrian protection device 10 for the automobile 1 according to a fourth embodiment of the present disclosure will be described. In the third embodiment, the first left standing deployment portion 45 deploys to a lower height than the second left standing deployment portion 46. The first right standing deployment portion 43 deploys to a lower height than the second right standing deployment portion 44. That is, the deployed height of the first left standing deployment portion 45 and the deployed height of the first right standing deployment portion 43 are lower than the deployed height of the second left standing deployment portion 46 and the deployed height of the second right standing deployment portion 44, both located between the first left standing deployment portion 45 and the first right standing deployment portion 43. In this case, as illustrated by a long dashed double-short dashed line in FIG. 8, the upper surface of the hood 4 is slightly curved with its both ends in the vehicle width direction lower than the middle in the vehicle width direction, and the bag 23 can be expected to deploy so as to be in contact with such an upper surface of the hood 4 along the entire length of the bag 23 in the vehicle with direction. When a load due to contact with a pedestrian is applied to the left rearward deployment portion 32 or the right rearward deployment portion 31, the left rearward deployment portion 32 or the right rearward deployment portion 31 can support the pedestrian as it receives a reaction force from the hood 4 etc. with which it is in contact. However, depending on the shapes of a vehicle body, a hood, etc. of a vehicle to which the present disclosure is applied, it may be desirable that the left rearward deployment portion 32 and the right rearward deployment portion 31 deploy to a position above the middle transverse deployment portion 30. For example, when the left rearward deployment portion 32 and the right rearward deployment portion 31 deploy to a position above the middle transverse deployment portion 30, a pedestrian who has fallen onto the middle transverse deployment portion 30 of the bag 23 is less likely to pass over the left rearward deployment portion 32 or the right rearward deployment portion 31 and fall in the vehicle width direction. Moreover, when the left rearward deployment portion 32 and the right rearward deployment portion 31 deploy to a position above the middle transverse deployment portion 30, the relative speed between a pedestrian and the vehicle body 2 can be reduced early. This can be expected to improve the pedestrian protection performance when a reaction force is generated by the vehicle body 2. In the fourth embodiment, an example is described in which the deployed height of the first left standing deployment portion 45 is higher than the deployed height of the second left standing deployment portion 46 and the deployed height of the first right standing deployment portion 43 is higher than the deployed height of the second right standing deployment portion 44. Hereinafter, the fourth embodiment will be described with reference to the drawings. In the fourth embodiment, the same components as those in the first, second, and third embodiments are denoted by the same signs, and illustration and description thereof will be omitted. The following description focuses on the differences of the fourth embodiment from the first, second, and third embodiments.

Deployed State of Bag

Figure 9:
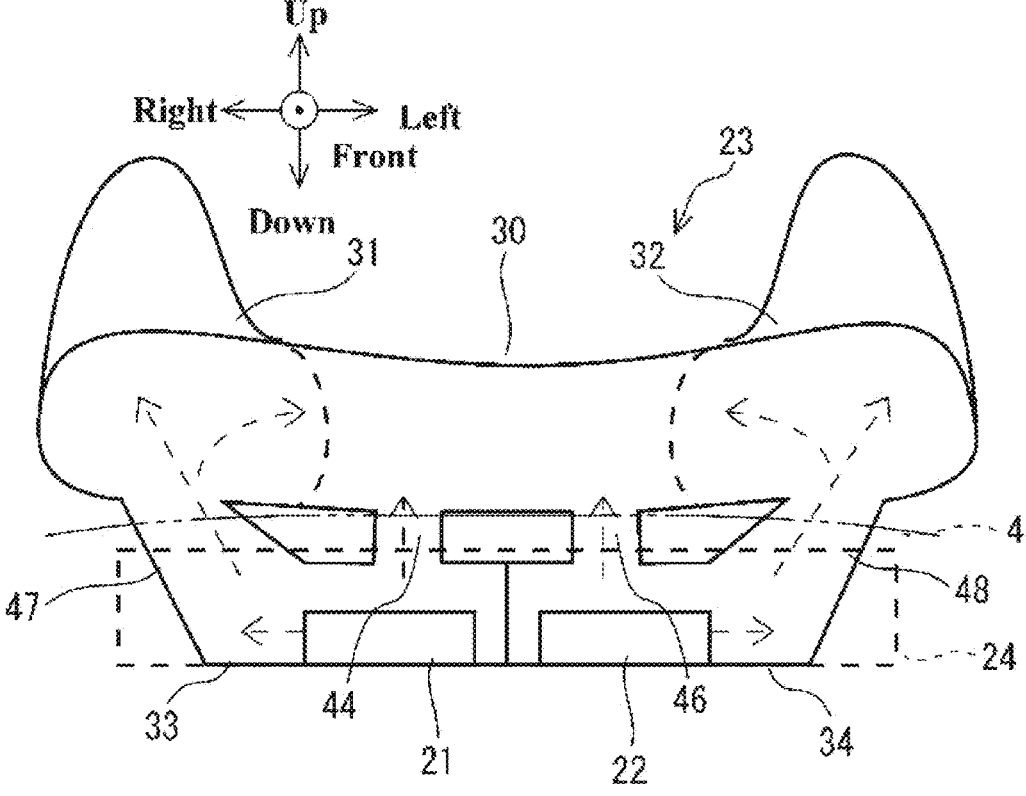
FIG. 9 illustrates a cross-section of a deployed bag of a pedestrian airbag device according to a fourth embodiment of the present disclosure as viewed from the same direction as in FIG. 6.

FIG. 9 illustrates a cross-section of the deployed bag 23 of the pedestrian airbag device 20 according to the fourth embodiment of the present disclosure as viewed from the same direction as in FIG. 6. In FIG. 9, the pedestrian airbag device 20 is viewed in cross-section along the same direction as in FIG. 6. In FIG. 9, the upper surface of the hood 4 is illustrated by a long dashed double-short dashed line, and the case 24 is illustrated by a dashed line. FIG. 9 illustrates the bag 23 fully deployed by high-pressure gas. The bag 23 deploys as illustrated in FIG. 9 from the same state as that in FIG. 4. Like the bag 23 in FIG. 5, the bag 23 has the front deployment portion 49.

In the fourth embodiment, the bag 23 has a first left standing deployment portion 48 and the second left standing deployment portion 46 as a left standing deployment portion. The first left standing deployment portion 48 deploys obliquely in the upper left direction inside the case 24. The first left standing deployment portion 48 connects the left rearward deployment portion 32 and the left fixed deployment portion 34. The second left standing deployment portion 46 deploys in the up-down direction at a position closer to the middle of the automobile 1 in the vehicle width direction than the first left standing deployment portion 48. The second left standing deployment portion 46 connects the middle transverse deployment portion 30 and the left fixed deployment portion 34. The second left standing deployment portion 46 deploys with a smaller channel cross-section than the first left standing deployment portion 48. The high-pressure gas therefore flows preferentially into the left rearward deployment portion 32 over into the middle transverse deployment portion 30.

In the fourth embodiment, the bag 23 has a first right standing deployment portion 47 and the second right standing deployment portion 44 as a right standing deployment portion. The first right standing deployment portion 47 deploys obliquely in the upper right direction inside the case 24. The first right standing deployment portion 47 connects the right rearward deployment portion 31 and the right fixed deployment portion 33. The second right standing deployment portion 44 deploys in the up-down direction at a position closer to the middle of the automobile 1 in the vehicle width direction than the first right standing deployment portion 47. The second right standing deployment portion 44 connects the middle transverse deployment portion 30 and the right fixed deployment portion 33. The second right standing deployment portion 44 deploys with a smaller channel cross-section than the first right standing deployment portion 47. The high-pressure gas therefore flows preferentially into the right rearward deployment portion 31 over into the middle transverse deployment portion 30.

As illustrated in FIG. 9, each of the first left standing deployment portion 48, the second left standing deployment portion 46, the first right standing deployment portion 47, and the second right standing deployment portion 44 deploys with a smaller channel cross-section than the cross-sectional size of the case 24. The total area of these four channel cross-sections is smaller than the cross-sectional size of the case 24. The first left standing deployment portion 48, the second left standing deployment portion 46, the first right standing deployment portion 47, and the second right standing deployment portion 44 are therefore less likely to deform or break the case 24 when they deploy. As illustrated in FIG. 5, vehicle equipment such as the wiper motor 6 is disposed around the case 24. When the case 24 is deformed by deployment of the bag 23, an external force may be applied to the vehicle equipment such as the wiper motor 6. The fourth embodiment can reduce the possibility of occurrence of such a situation.

Each of the first left standing deployment portion 48, the second left standing deployment portion 46, the first right standing deployment portion 47, and the second right standing deployment portion 44 deploys to a height equal to or higher than the height position of the upper surface of the hood 4 at the time of deployment of the bag 23. This allows the middle transverse deployment portion 30, the left rearward deployment portion 32, and the right rearward deployment portion 31 to deploy above the upper surface of the hood 4. Moreover, in the fourth embodiment, the deployed height of the first left standing deployment portion 48 from the bottom of the case 24 is higher than the deployed height of the second left standing deployment portion 46, as illustrated in FIG. 9. The deployed height of the first right standing deployment portion 47 is higher than the deployed height of the second right standing deployment portion 44. This allows the left rearward deployment portion 32 and the right rearward deployment portion 31 to deploy upward and away from the upper surface of the hood 4 illustrated by the long dashed double-short dashed line in FIG. 9. The upper surface of the hood 4 illustrated by the long dashed double-short dashed line in FIG. 9 has a curved shape with its left and right ends lower than the middle in the vehicle width direction. The middle transverse deployment portion 30 is in close contact with the upper surface of the hood 4.

In the fourth embodiment, the left inflator 22 releases high-pressure gas to the left as illustrated in FIG. 9. The high-pressure gas then flows smoothly in the upper left direction into the oblique first left standing deployment portion 48 and then into the left rearward deployment portion 32 without stagnating in the first left standing deployment portion 48. Since the high-pressure gas having a high pressure thus flows preferentially into the left rearward deployment portion 32, the left rearward deployment portion 32 folded in multiple layers in the case 24 can efficiently deploy rearward. As illustrated in FIG. 9, the right inflator 21 releases high-pressure gas to the right. The high-pressure gas then flows smoothly in the upper right direction into the oblique first right standing deployment portion 47 and then into the right rearward deployment portion 31 without stagnating in the first right standing deployment portion 47. Since the high-pressure gas having a high pressure thus flows preferentially into the right rearward deployment portion 31, the right rearward deployment portion 31 folded in multiple layers in the case 24 can efficiently deploy rearward. This allows the left rearward deployment portion 32 and the right rearward deployment portion 31 to deploy without significant delay with respect to the middle transverse deployment portion 30.

The high-pressure gas flowing from the left inflator 22 through the left rearward deployment portion 32 into the middle transverse deployment portion 30 flows to the right in the middle transverse deployment portion 30. The high-pressure gas flowing from the right inflator 21 through the right rearward deployment portion 31 into the middle transverse deployment portion 30 flows to the left in the middle transverse deployment portion 30. In the middle transverse deployment portion 30, the rightward flow of the high-pressure gas from the left inflator 22 and the leftward flow of the high-pressure gas from the right inflator 21 cancel each other out. The flow of the high-pressure gas from the middle transverse deployment portion 30 to the left rearward deployment portion 32 or the right rearward deployment portion 31 is weakened. The second left standing deployment portion 46 and the second right standing deployment portion 44 are directly connected with the middle transverse deployment portion 30. Therefore, the middle transverse deployment portion 30 can deploy without significant delay with respect to the left rearward deployment portion 32 and the right rearward deployment portion 31. Since the outward flows of the high-pressure gas are weakened, the left rearward deployment portion 32 is less likely to deploy outward to the left, and the right rearward deployment portion 31 is less likely to deploy outward to the right. The left rearward deployment portion 32 and the right rearward deployment portion 31 are also less likely to flap during deployment.

As a result, in the fourth embodiment, the left rearward deployment portion 32 and the right rearward deployment portion 31 can deploy so as to quickly stabilize in a desired state, namely a state in which the left rearward deployment portion 32 overlaps the left A-pillar 9 and the right rearward deployment portion 31 overlaps the right A-pillar 9. Once deployment of the bag 23 is started, the entire bag 23 can quickly deploy into a desired U-shape in the desired state, namely in the state in which the bag 23 overlaps the right and left A-pillars 9.

Effects

As described above, in the fourth embodiment, the deployed height of the first left standing deployment portion 48 is higher than the deployed height of the second left standing deployment portion 46, and the deployed height of the first right standing deployment portion 47 is higher than the deployed height of the second right standing deployment portion 44. That is, the deployed height of the first left standing deployment portion 48 and the deployed height of the first right standing deployment portion 47 are higher than the deployed height of the second left standing deployment portion 46 and the deployed height of the second right standing deployment portion 44 that are the standing deployment portions located between the first left standing deployment portion 48 and the first right standing deployment portion 47. The left rearward deployment portion 32 with which the first left standing deployment portion 48 is connected and the right rearward deployment portion 31 with which the first right standing deployment portion 47 is connected are therefore more likely to be away from the hood 4 when the middle transverse deployment portion 30 is in the deployed state. The bag 23 may deploy so as to contact the middle part of the upper surface of the hood 4 that is slightly curved with its both ends in the vehicle width direction lower than the middle in the vehicle width direction, and the area around the middle part of the upper surface of the hood 4. The right rearward deployment portion 31 and the left rearward deployment portion 32 float on the right and left sides of the middle transverse deployment portion 30. The bag 23 as a whole thus deploys in a bow shape as illustrated in FIG. 9. A pedestrian is therefore less likely to fall to the right or left of the bag 23 after falling onto the bag 23. Since the second left standing deployment portion 46 and the second right standing deployment portion 44 are connected with the middle transverse deployment portion 30, the entire bag 23 is less likely to tilt to the right or left even when a load is acting on the bag 23. Moreover, since the first left standing deployment portion 48 and the first right standing deployment portion 47 deploy high, a pedestrian can contact the bag 23 early. The speed of a pedestrian relative to the automobile 1 decreases by contact with the deployed bag 23, and can be expected to decrease significantly by early contact. The period from when a pedestrian starts to contact the bag 23 until the pedestrian receives a reaction force from the vehicle body 2 is increased. As a result, the degree of influence of the reaction force from the vehicle body 2 on a pedestrian can be reduced.

In the fourth embodiment, the left rearward deployment portion 32 and the right rearward deployment portion 31 deploy to a position above the middle transverse deployment portion 30. The left rearward deployment portion 32 and the right rearward deployment portion 31 deploy so as to float slightly from the hood 4 with the middle transverse deployment portion 30 being in contact with the hood 4. Therefore, a pedestrian who has fallen onto the bag 23 deployed on the hood 4 is less likely to pass over the left rearward deployment portion 32 or the right rearward deployment portion 31 and fall in the vehicle width direction. In the fourth embodiment, the second left standing deployment portion 46 and the second right standing deployment portion 44 are provided between the first left standing deployment portion 48 and the first right standing deployment portion 47 that are located on the outer side in the vehicle width direction. The second left standing deployment portion 46 and the second right standing deployment portion 44 deploy lower than the first left standing deployment portion 48 and the first right standing deployment portion 47, respectively. Even if a load from a pedestrian is applied unevenly in the vehicle width direction to the left rearward deployment portion 32 or the right rearward deployment portion 31 that deploys so as to float from the hood 4, the attitude of the deployed bag 23 is less likely to change from the state in FIG. 9, namely is less likely to tilt with respect to the vehicle width direction from the state in FIG. 9. The bag 23 can support a pedestrian who is going to pass over the left rearward deployment portion 32 or the right rearward deployment portion 31 and fall in the vehicle width direction.

Since the left rearward deployment portion 32 and the right rearward deployment portion 31 deploy to a position above the middle transverse deployment portion 30, this can be expected to reduce the relative speed between a pedestrian and the vehicle body 2 and to improve the pedestrian protection performance when a reaction force is generated by the vehicle body 2. In the vehicle body 2, the A-pillars 9 are harder than the windshield 5 in the middle. A pedestrian who falls toward the left rearward deployment portion 32 or the right rearward deployment portion 31 can be restrained early because the left rearward deployment portion 32 and the right rearward deployment portion 31 are deployed to a position above the middle transverse deployment portion 30. Thereafter, the left rearward deployment portion 32 or the right rearward deployment portion 31 comes into contact with a corresponding one of the A-pillars 9 due to the action of a load caused by contact with the pedestrian, and generates a reaction force. In this case, it can be expected that the relative speed between the pedestrian and the vehicle body 2 has already started to decrease at that point due to the early restraint. The impact on the pedestrian when the reaction force is generated can be reduced.

As described above, the fourth embodiment can be expected to improve the pedestrian protection performance as the bag 23 quickly deploys into a desired state onto the vehicle body 2. In the fourth embodiment, early contact between a pedestrian and the left rearward deployment portion 32 or the right rearward deployment portion 31 of the bag 23 can be expected. Therefore, the fourth embodiment can be expected to further improve the pedestrian protection performance. In the fourth embodiment, a pedestrian is less likely to fall to the right or left of the bag 23 after falling onto the bag 23.

The first, second, third, and fourth embodiments are merely examples of embodiments of the present disclosure. The present disclosure is not limited to these, and various modifications or alterations may be made without departing from the spirit and scope of the disclosure.

Modifications

The first embodiment is an example in which the left standing deployment portion is composed of the first left standing deployment portion 36. The second embodiment is an example in which the left standing deployment portion is composed of the first left standing deployment portion 42. The third embodiment is an example in which the left standing deployment portion is composed of two standing deployment portions, that is, the first left standing deployment portion 45 and the second left standing deployment portion 46. The fourth embodiment is an example in which the left standing deployment portion is composed of two standing deployment portions, that is, the first left standing deployment portion 48 and the second left standing deployment portion 46. The first embodiment is an example in which the right standing deployment portion is composed of the first right standing deployment portion 35. The second embodiment is an example in which the right standing deployment portion is composed of the first right standing deployment portion 41. The third embodiment is an example in which the right standing deployment portion is composed of two standing deployment portions, that is, the first right standing deployment portion 43 and the second right standing deployment portion 44. The fourth embodiment is an example in which the right standing deployment portion is composed of two standing deployment portions, that is, the first right standing deployment portion 47 and the second right standing deployment portion 44. In addition to the above examples, for example, each of the left standing deployment portion and the right standing deployment portion may be composed of three or more standing deployment portions. Rather than deploying to the same height position, the three or more standing deployment portions on each of the right and left sides may deploy to different height positions in ascending order from the middle to outermost standing deployment portions in the vehicle width direction, namely with the middle standing deployment portion to the lowest height position and the outermost standing deployment portion to the highest height portion, or in descending order with the middle standing deployment portion to the highest height position and the outermost standing deployment portion to the lowest height portion.

What is claimed is:

1. A pedestrian airbag device for a vehicle, the pedestrian airbag device comprising:
   a case provided below a hood of the vehicle, the case being elongated in a vehicle width direction of the vehicle;
   a bag configured to deploy from between the hood and a windshield, the bag being stored in the case; and
   a left inflator and a right inflator that are configured to release high-pressure gas into the bag stored in the case, the left inflator and the right inflator being arranged side by side in the vehicle width direction, wherein:

the bag has
      a left rearward deployment portion configured to deploy along a left edge of the windshield in the vehicle width direction,
      a right rearward deployment portion configured to deploy along a right edge of the windshield in the vehicle width direction,
      a middle transverse deployment portion configured to deploy in the vehicle width direction between the hood and the windshield, the left rearward deployment portion being connected with a left end of the middle transverse deployment portion in the vehicle width direction, and the right rearward deployment portion being connected with a right end of the middle transverse deployment portion in the vehicle width direction,
      a left fixed portion configured to deploy inside the case, the left fixed portion being coupled to the left inflator and fixed to the case,
      a right fixed portion configured to deploy inside the case, the right fixed portion being coupled to the right inflator and fixed to the case at a position rightward of the left fixed portion in the vehicle width direction,
      a first left standing deployment portion that connects at least the left rearward deployment portion out of the middle transverse deployment portion and the left rearward deployment portion to the left fixed portion, and
      a first right standing deployment portion that connects at least the right rearward deployment portion out of the middle transverse deployment portion and the right rearward deployment portion to the right fixed portion; and
   the first left standing deployment portion and the first right standing deployment portion are configured to deploy to above an upper edge of the case.

2. The pedestrian airbag device according to claim 1, wherein:
   the first left standing deployment portion and the first right standing deployment portion are configured to deploy above an upper surface of the hood at a time of deployment of the bag; and
   the middle transverse deployment portion, the left rearward deployment portion, and the right rearward deployment portion have a front deployment portion configured to deploy forward of the case, and the front deployment portion is configured to deploy onto the hood at the time of the deployment of the bag.

3. The pedestrian airbag device according to claim 1, wherein:
   the first left standing deployment portion is connected with the left rearward deployment portion out of the middle transverse deployment portion and the left rearward deployment portion, and is configured to deploy obliquely in an upper left direction inside the case;
   the left inflator is disposed leftward of the right inflator and is configured to release the high-pressure gas leftward;
   the first right standing deployment portion is connected with the right rearward deployment portion out of the middle transverse deployment portion and the right rearward deployment portion, and is configured to deploy obliquely in an upper right direction inside the case; and
   the right inflator is configured to release the high-pressure gas rightward.

4. The pedestrian airbag device according to claim 1, wherein:

the bag has a second left standing deployment portion that connects the middle transverse deployment portion and the left fixed portion at a position closer to a middle of the vehicle in the vehicle width direction than the first left standing deployment portion, and a second right standing deployment portion that connects the middle transverse deployment portion and the right fixed portion at a position closer to the middle of the vehicle in the vehicle width direction than the first right standing deployment portion;

the second left standing deployment portion is configured to deploy with a smaller channel cross-section than the first left standing deployment portion so as to protrude upward from the case; and the second right standing deployment portion is configured to deploy with a smaller channel cross-section than the first right standing deployment portion so as to protrude upward from the case.

5. The pedestrian airbag device according to claim 3, wherein:

the bag has a second left standing deployment portion that connects the middle transverse deployment portion and the left fixed portion at a position closer to a middle of the vehicle in the vehicle width direction than the first left standing deployment portion, and a second right standing deployment portion that connects the middle transverse deployment portion and the right fixed portion at a position closer to the middle of the vehicle in the vehicle width direction than the first right standing deployment portion;

the second left standing deployment portion is configured to deploy with a smaller channel cross-section than the first left standing deployment portion so as to protrude upward from the case; and the second right standing deployment portion is configured to deploy with a smaller channel cross-section than the first right standing deployment portion so as to protrude upward from the case.

6. The pedestrian airbag device according to claim 4, wherein a deployed height of the first left standing deployment portion is lower than a deployed height of the second left standing deployment portion, and a deployed height of the first right standing deployment portion is lower than a deployed height of the second right standing deployment portion.

7. The pedestrian airbag device according to claim 5, wherein a deployed height of the first left standing deployment portion is lower than a deployed height of the second left standing deployment portion, and a deployed height of the first right standing deployment portion is lower than a deployed height of the second right standing deployment portion.

8. The pedestrian airbag device according to claim 4, wherein a deployed height of the first left standing deployment portion is higher than a deployed height of the second left standing deployment portion, and a deployed height of the first right standing deployment portion is higher than a deployed height of the second right standing deployment portion.

9. The pedestrian airbag device according to claim 5, wherein a deployed height of the first left standing deployment portion is higher than a deployed height of the second left standing deployment portion, and a deployed height of the first right standing deployment portion is higher than a deployed height of the second right standing deployment portion.

* * * * *